United States Patent
Bhat et al.

(10) Patent No.: US 12,488,837 B2
(45) Date of Patent: Dec. 2, 2025

(54) TIME TAG WORD LINE SHIFT TO REDUCE FAILED BIT COUNT SPIKES FOR EDGE WORD LINES

(71) Applicant: Sandisk Technologies, Inc., Milpitas, CA (US)

(72) Inventors: Ganapati Bhat, Bengaluru (IN); Binoy Jose Panakkal, Kochi (IN); Gopu S, Kollam (IN); Bhavadip Bipinbhai Solanki, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 279 days.

(21) Appl. No.: 18/517,579

(22) Filed: Nov. 22, 2023

(65) Prior Publication Data
US 2025/0166705 A1    May 22, 2025

(51) Int. Cl.
*G11C 16/08*    (2006.01)
*G11C 16/10*    (2006.01)
*G11C 16/34*    (2006.01)

(52) U.S. Cl.
CPC ............ *G11C 16/08* (2013.01); *G11C 16/102* (2013.01); *G11C 16/3459* (2013.01)

(58) Field of Classification Search
CPC .... G11C 16/08; G11C 16/102; G11C 16/3459
USPC .................................................. 365/189.011
See application file for complete search history.

(56) References Cited

U.S. PATENT DOCUMENTS

| | | | |
|---|---|---|---|
| 9,208,023 B2 * | 12/2015 | Lasser | G06F 11/1072 |
| 10,038,005 B1 * | 7/2018 | Zhang | G11C 16/3427 |
| 2019/0377512 A1 | 12/2019 | Hodes et al. | |
| 2020/0142835 A1 * | 5/2020 | Lin | G06F 3/064 |

* cited by examiner

*Primary Examiner* — Anthan Tran
(74) *Attorney, Agent, or Firm* — Pearl Cohen Zedek Latzer Baratz LLP

(57) ABSTRACT

When an open block of NAND memory is read, this places the edge word lines under a set of bias conditions that can lead to disturbs. When time tag values are stored on pre-defined word lines, and the predefined word line is an edge word line, this can degrade not just the user data on the word line, but also the time tag values, leading to a failed bit count spike. To address this problem, a time tag word line shift approach is introduced where, if a predetermined time tag acquisition word line is an edge word line, another word line is instead used to acquire the time tag value.

20 Claims, 25 Drawing Sheets

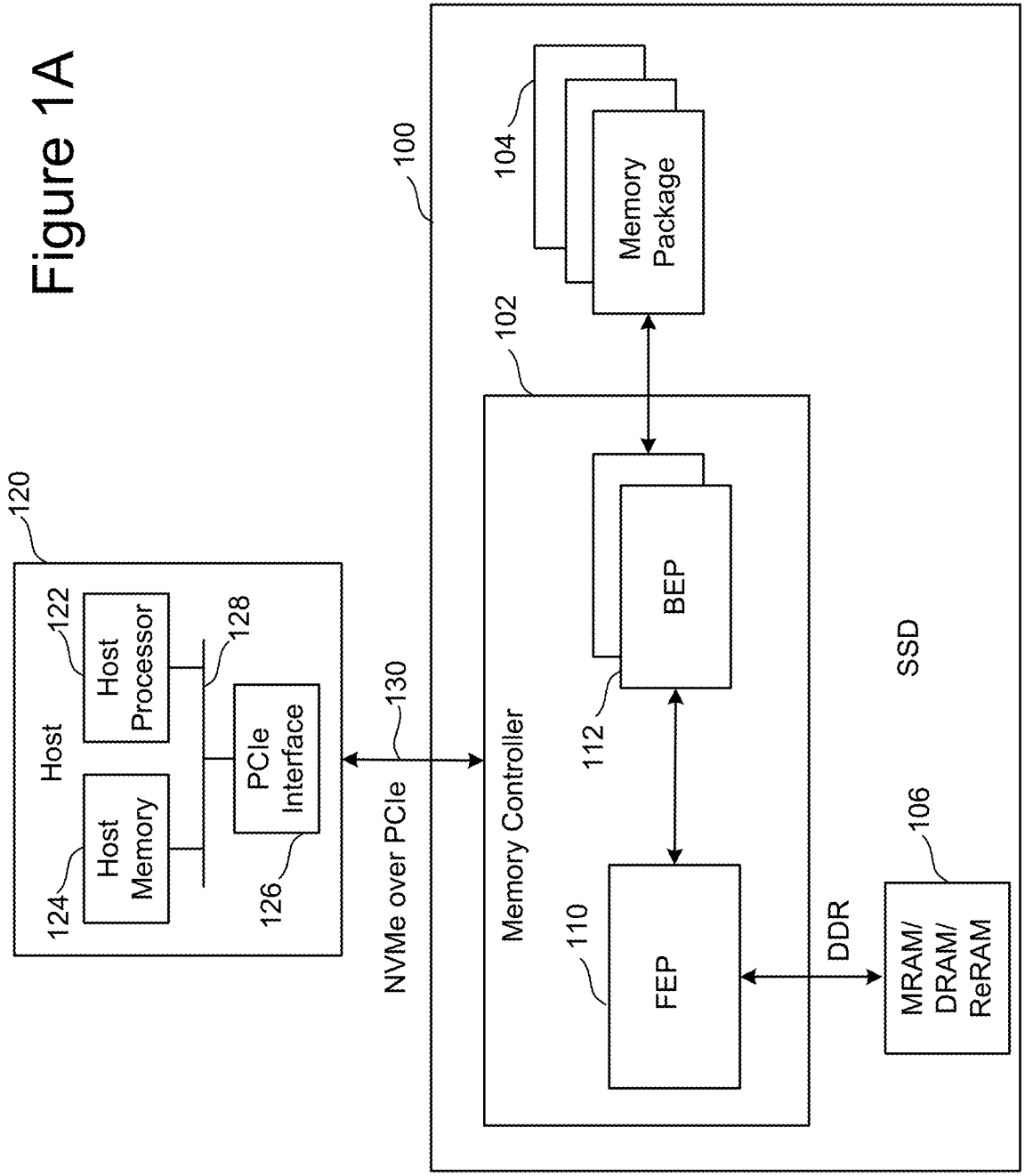

Figure 7A
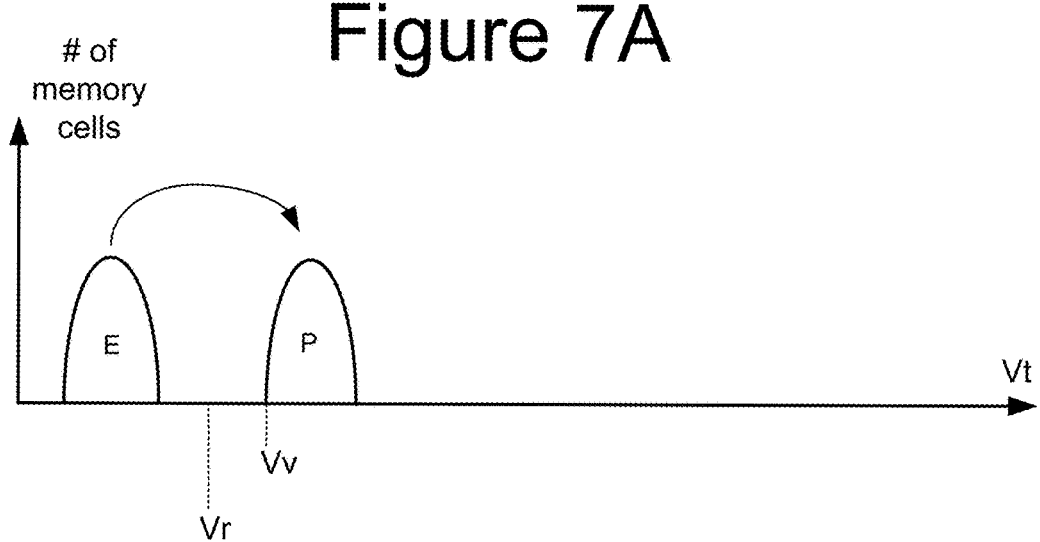
Figure 7B
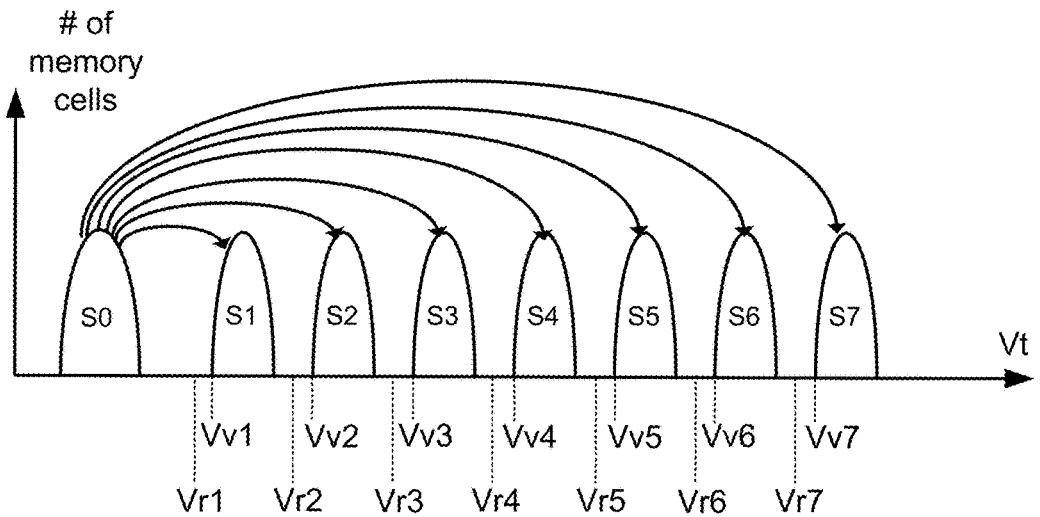
Figure 7C
|  | S0 | S1 | S2 | S3 | S4 | S5 | S6 | S7 |
|---|---|---|---|---|---|---|---|---|
| Upper Page | 1 | 1 | 1 | 0 | 0 | 0 | 0 | 1 |
| Middle Page | 1 | 1 | 0 | 0 | 1 | 1 | 0 | 0 |
| Lower Page | 1 | 0 | 0 | 0 | 0 | 1 | 1 | 1 |

TIME TAG WORD LINE SHIFT TO REDUCE FAILED BIT COUNT SPIKES FOR EDGE WORD LINES

BACKGROUND

The present disclosure relates to technology for non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery). An example of non-volatile memory is flash memory (e.g., NAND-type and NOR-type flash memory). Users of non-volatile memory typically want the memory to operate at high speeds so that they do not need to wait for memory operations to be completed.

BRIEF DESCRIPTION OF THE DRAWINGS

Like-numbered elements refer to common components in the different figures.

FIG. 1A is a block diagram of one embodiment of a storage system connected to a host.

FIG. 7A depicts threshold voltage distributions of memory cells in a binary embodiment.

FIG. 7B depicts threshold voltage distributions of memory cells in a multi-level cell (MLC) embodiment.

FIG. 7C is a table describing one example of an assignment of data values to data states.

DETAILED DESCRIPTION

Figure 1B:
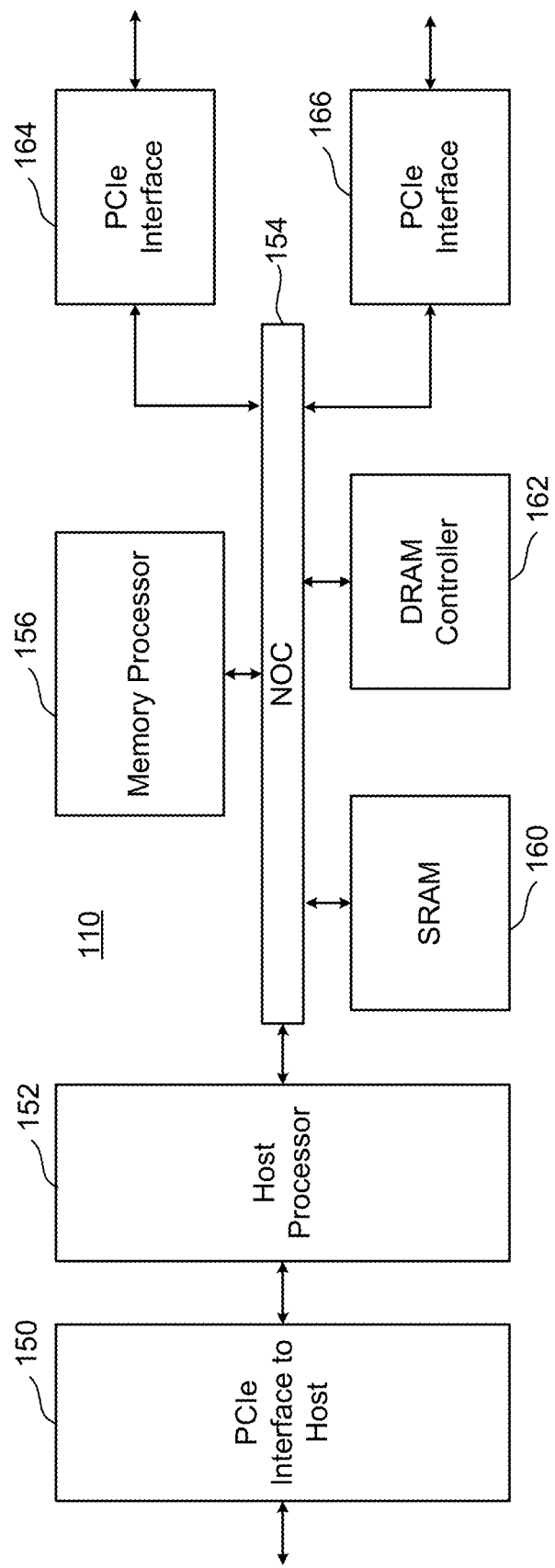
FIG. 1B is a block diagram of one embodiment of a Front End Processor Circuit.

For open blocks of NAND memory, in which less than all of the word lines have been written, an "edge" word line is a word line that has been programmed, but that is adjacent to a word line that is still in the erased state. When such an open memory block is read, this places the edge word lines under a set of bias conditions that can lead to disturbs. Many embodiments for memory systems store time tag values on the word lines, which are time stamp values that can later be read back and used in memory operations, where the time tag value can be used for things such optimizing read levels or other operating parameters or for determining when to perform a data refresh operation. One or more predetermined word lines may be set aside to be read for obtaining time tag values. If such a predetermined word line is an edge word line, the disturb of the edge word line can lead to spike in the failed bit count of the block since the disturb to the edge word line will not just affect user data on the word line, but also the time tag value, which will in turn affect parameter values based on the time tag value. To address this problem, the following introduces a time tag word line shift approach where, if a predetermined time tag acquisition word line is an edge word line, another word line is instead used to acquire the time tag.

FIGS. 1A-6E describe one example of a storage system that can be used to implement the technology disclosed herein.

FIG. 1A is a block diagram of one embodiment of a storage system 100 connected to a host system 120. Storage system 100 can implement the technology disclosed herein. Many different types of storage systems can be used with the technology disclosed herein. One example storage system is a solid state drive ("SSD"); however, other types of storage systems can also be used. Storage system 100 comprises a memory controller 102, memory package 104 for storing data, and local memory (e.g., MRAM/DRAM/ReRAM) 106. Memory controller 102 comprises a Front End Processor Circuit (FEP) 110 and one or more Back End Processor Circuits (BEP) 112. In one embodiment FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the memory controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory package 104 at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Memory controller 102 is one example of a control circuit.

In one embodiment, there are a plurality of memory packages 104. Each memory package 104 may contain one or more memory dies. In one embodiment, each memory die in the memory package 104 utilizes NAND flash memory (including two dimensional NAND flash memory and/or three dimensional NAND flash memory). In other embodiments, the memory package 104 can include other types of memory; for example, the memory package can include Phase Change Memory (PCM) memory.

In one embodiment, memory controller 102 communicates with host system 120 using an interface 130 that implements NVM Express (NVMe) over PCI Express (PCIe). For working with storage system 100, host system 120 includes a host processor 122, host memory 124, and a PCIe interface 126, which communicate over bus 128. Host memory 124 is the host's physical memory, and can be DRAM, SRAM, non-volatile memory or another type of storage. Host system 120 is external to and separate from storage system 100. In one embodiment, storage system 100 is embedded in host system 120. In other embodiments, the controller 102 may communicate with host 120 via other types of communication buses and/or links, including for example, over an NVMe over Fabrics architecture, or a cache/memory coherence architecture based on Cache Coherent Interconnect for Accelerators (CCIX), Compute Express Link (CXL), Open Coherent Accelerator Processor Interface (OpenCAPI), Gen-Z and the like. For simplicity, the example embodiments below will be described with respect to a PCIe example.

FIG. 1B is a block diagram of one embodiment of FEP circuit 110. FIG. 1B shows a PCIe interface 150 to communicate with host system 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use un-clocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the local memory 106 (e.g., DRAM/MRAM/ReRAM). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 1B, memory controller 102 includes two BEP circuits 112; therefore, there are two PCIe Interfaces 164/166. Each PCIe Interface communicates with one of the BEP circuits 112. In other embodiments, there can be more or fewer than two BEP circuits 112; therefore, there can be more than two PCIe Interfaces.

Figure 2A:
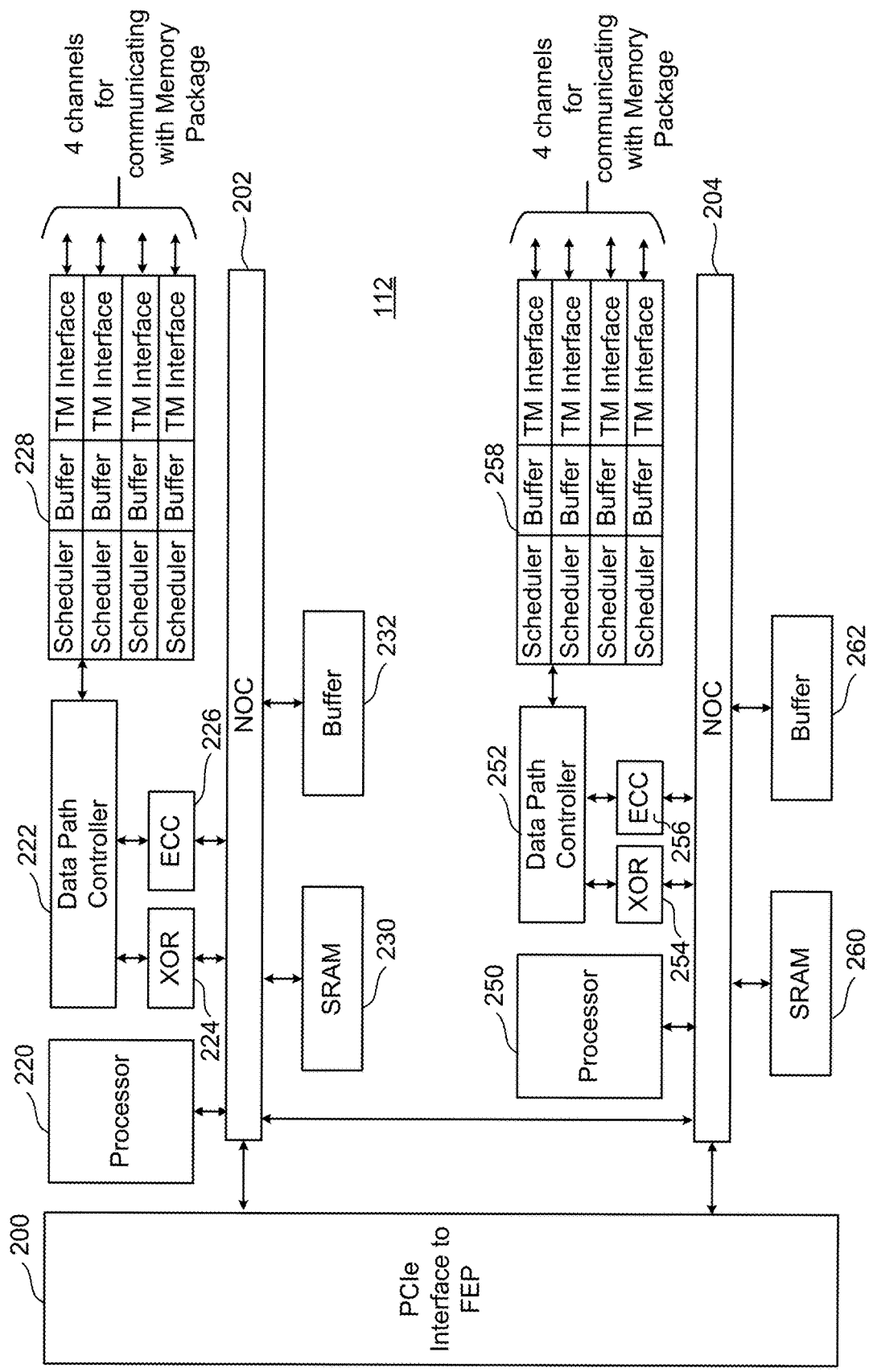
FIG. 2A is a block diagram of one embodiment of a Back End Processor Circuit.

FIG. 2A is a block diagram of one embodiment of the BEP circuit 112. FIG. 2A shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254), an ECC engine (226/256).

The ECC engines 226/256 are used to perform error correction, as known in the art. Herein, the ECC engines 226/256 may be referred to as controller ECC engines. The XOR engines 224/254 are used to XOR the data so that data can be combined and stored in a manner that can be recovered in case there is a programming error. In an embodiment, the XOR engines 224/254 are able to recover data that cannot be decoded using ECC engine 226/256.

Data path controller 222 is connected to a memory interface 228 for communicating via four channels with integrated memory assemblies. Thus, the top NOC 202 is associated with memory interface 228 for four channels for communicating with integrated memory assemblies and the bottom NOC 204 is associated with memory interface 258 for four additional channels for communicating with integrated memory assemblies. In one embodiment, each memory interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254, ECC engines 226/256 can be implemented in software. The scheduler, buffer, and TM Interfaces are hardware circuits. In other embodiments, the memory interface (an electrical circuit for communicating with memory dies) can be a different structure than depicted in FIG. 2A. Additionally, controllers with structures different than FIGS. 1B and 2A can also be used with the technology described herein.

Figure 2B:
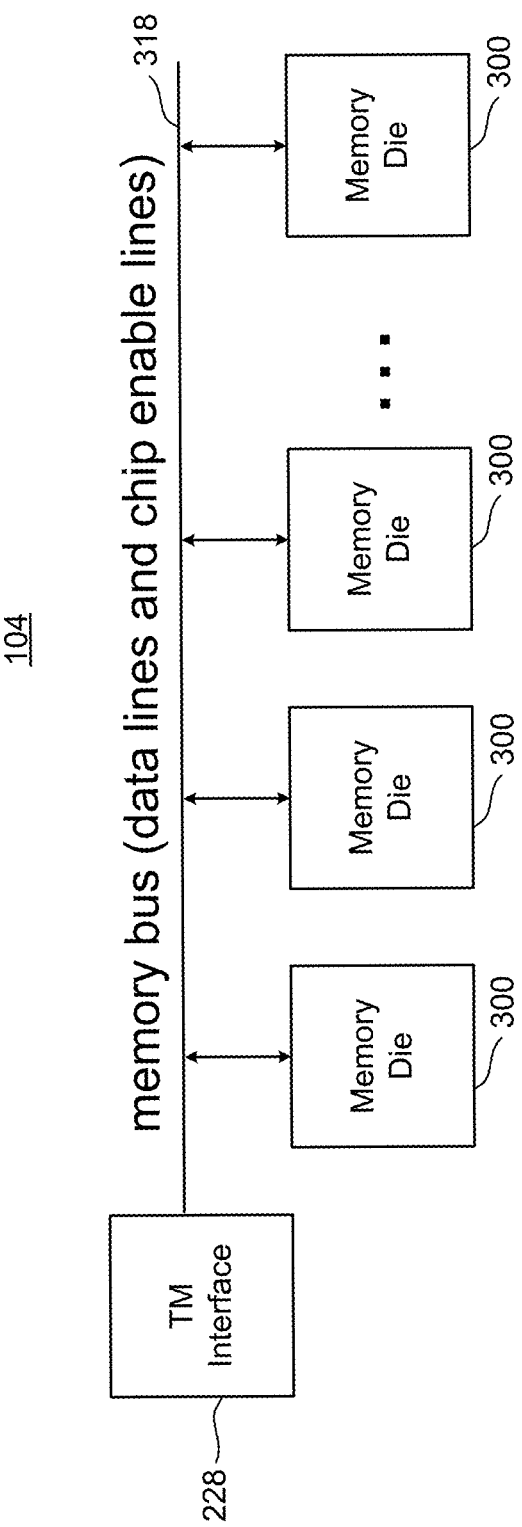
FIG. 2B is a block diagram of one embodiment of a memory package.

FIG. 2B is a block diagram of one embodiment of a memory package 104 that includes a plurality of memory dies 300 connected to a memory bus (data lines and chip enable lines) 318. The memory bus 318 connects to a Toggle Mode Interface 228 for communicating with the TM Interface of a BEP circuit 112 (see e.g., FIG. 2A). In some embodiments, the memory package can include a small controller connected to the memory bus and the TM Interface. In total, the memory package 104 may have eight or sixteen memory die; however, other numbers of memory die can also be implemented. The technology described herein is not limited to any particular number of memory die. In some embodiments, the memory package can also include a processor, CPU device, such as a RISC-V CPU along with some amount of RAM to help implement some of capabilities described below. The technology described herein is not limited to any particular number of memory die.

Figure 3A:
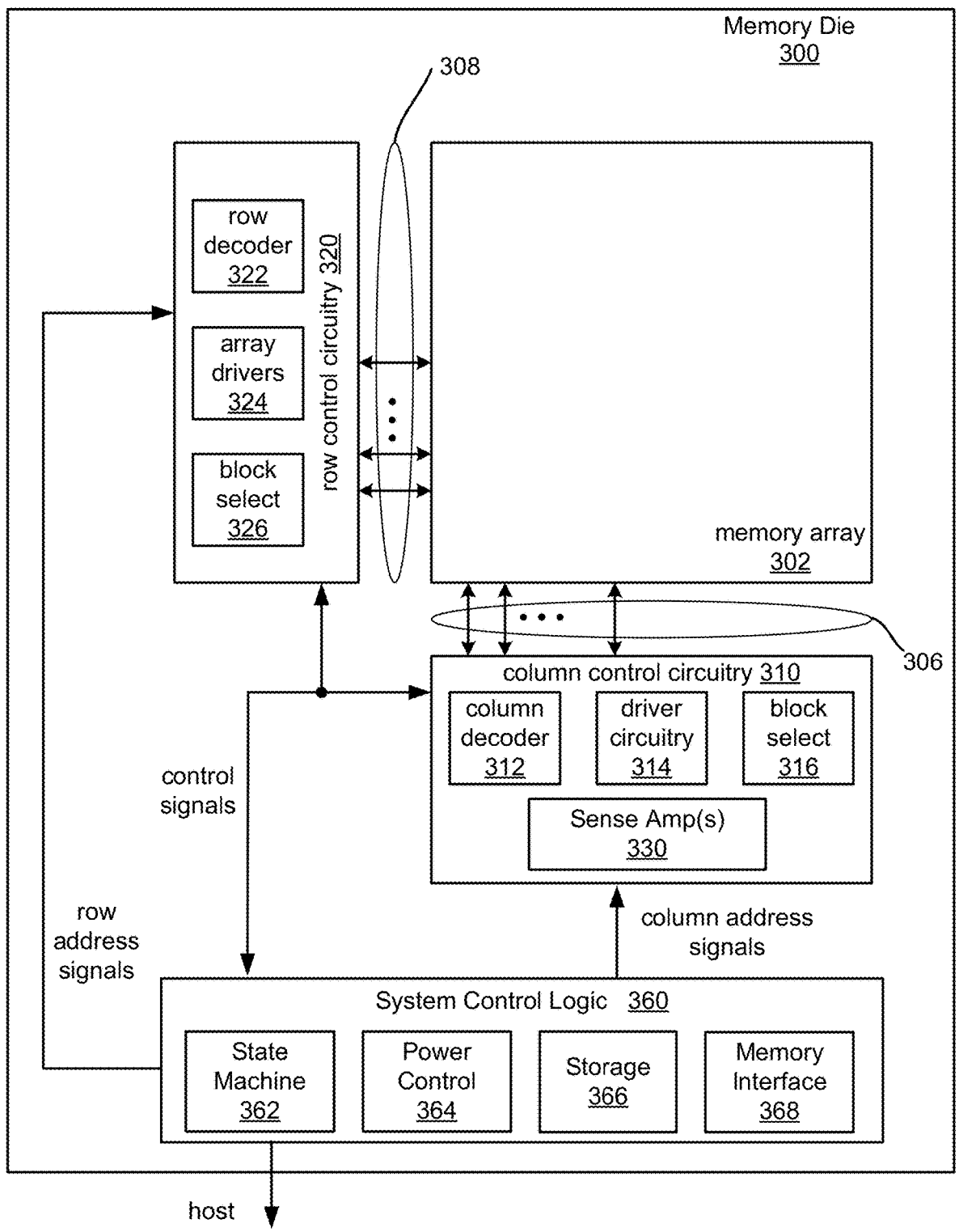
FIG. 3A is a functional block diagram of an embodiment of a memory die.

FIG. 3A is a block diagram that depicts one example of a memory die 300 that can implement the technology described herein. Memory die 300, which can correspond to one of the memory die 300 of FIG. 2B, includes a memory array 302 that can include any of memory cells described in the following. The array terminal lines of memory array 302 include the various layer(s) of word lines organized as rows, and the various layer(s) of bit lines organized as columns. However, other orientations can also be implemented. Memory die 300 includes row control circuitry 320, whose outputs 308 are connected to respective word lines of the memory array 302. Row control circuitry 320 receives a group of M row address signals and one or more various control signals from System Control Logic circuit 360, and typically may include such circuits as row decoders 322, array terminal drivers 324, and block select circuitry 326 for both reading and writing operations. Row control circuitry 320 may also include read/write circuitry. Memory die 300 also includes column control circuitry 310 including sense amplifier(s) 330 whose input/outputs 306 are connected to respective bit lines of the memory array 302. Although only a single block is shown for array 302, a memory die can include multiple arrays that can be individually accessed. Column control circuitry 310 receives a group of N column address signals and one or more various control signals from System Control Logic 360, and typically may include such circuits as column decoders 312, array terminal receivers or drivers 314, block select circuitry 316, as well as read/write circuitry, and I/O multiplexers.

System control logic 360 receives data and commands from a host and provides output data and status to the host. In other embodiments, system control logic 360 receives data and commands from a separate controller circuit and provides output data to that controller circuit, with the controller circuit communicating with the host. In some embodiments, the system control logic 360 can include a state machine 362 that provides die-level control of memory operations. In one embodiment, the state machine 362 is programmable by software. In other embodiments, the state machine 362 does not use software and is completely implemented in hardware (e.g., electrical circuits). In another embodiment, the state machine 362 is replaced by a micro-controller or microprocessor, either on or off the memory chip. The system control logic 360 can also include a power control module 364 controls the power and voltages supplied to the rows and columns of the memory 302 during memory operations and may include charge pumps and regulator circuit for creating regulating voltages. System control logic 360 includes storage 366, which may be used to store parameters for operating the memory array 302.

Commands and data are transferred between the controller 102 and the memory die 300 via memory controller interface 368 (also referred to as a "communication interface"). Memory controller interface 368 is an electrical interface for communicating with memory controller 102. Examples of memory controller interface 368 include a Toggle Mode Interface and an Open NAND Flash Interface (ONFI). Other I/O interfaces can also be used. For example, memory controller interface 368 may implement a Toggle Mode Interface that connects to the Toggle Mode interfaces of memory interface 228/258 for memory controller 102. In one embodiment, memory controller interface 368 includes a set of input and/or output (I/O) pins that connect to the controller 102.

In some embodiments, all of the elements of memory die 300, including the system control logic 360, can be formed as part of a single die. In other embodiments, some or all of the system control logic 360 can be formed on a different die.

For purposes of this document, the phrase "one or more control circuits" can include a controller, a state machine, a micro-controller, micro-processor, and/or other control circuitry as represented by the system control logic 360, or other analogous circuits that are used to control non-volatile memory.

In one embodiment, memory structure 302 comprises a three dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping.

In another embodiment, memory structure 302 comprises a two dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 302 is not limited to the examples above. Many different types of memory array architectures or memory technologies can be used to form memory structure 302. No particular non-volatile memory technology is required for purposes of the new claimed embodiments proposed herein. Other examples of suitable technologies for memory cells of the memory structure 302 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 302 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 3A can be grouped into two parts, the structure of memory structure 302 of the memory cells and the peripheral circuitry, including all of the other elements. An important characteristic of a memory circuit is its capacity, which can be increased by increasing the area of the memory die of memory system 100 that is given over to the memory structure 302; however, this reduces the area of the memory die available for the peripheral circuitry. This can place quite severe restrictions on these peripheral elements. For example, the need to fit sense amplifier circuits within the available area can be a significant restriction on sense amplifier design architectures. With respect to the system control logic 360, reduced availability of area can limit the available functionalities that can be implemented on-chip. Consequently, a basic trade-off in the design of a memory die for the memory system 100 is the amount of area to devote to the memory structure 302 and the amount of area to devote to the peripheral circuitry.

Another area in which the memory structure 302 and the peripheral circuitry are often at odds is in the processing involved in forming these regions, since these regions often involve differing processing technologies and the trade-off in having differing technologies on a single die. For example, when the memory structure 302 is NAND flash, this is an NMOS structure, while the peripheral circuitry is often CMOS based. For example, elements such sense amplifier circuits, charge pumps, logic elements in a state machine, and other peripheral circuitry in system control logic 360 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 3A onto separately formed dies that are then bonded together. More specifically, the memory structure 302 can be formed on one die and some or all of the peripheral circuitry elements, including one or more control circuits, can be formed on a separate die. For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate die. This allows each of the memory die to be optimized individually according to its technology. For example, a NAND memory die can be optimized for an NMOS based memory array structure, without worrying about the CMOS elements that have now been moved onto a separate peripheral circuitry die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other memory circuit. Although the following will focus on a bonded memory circuit of one memory die and one peripheral circuitry die, other embodiments can use more die, such as two memory die and one peripheral circuitry die, for example.

Figure 3B:
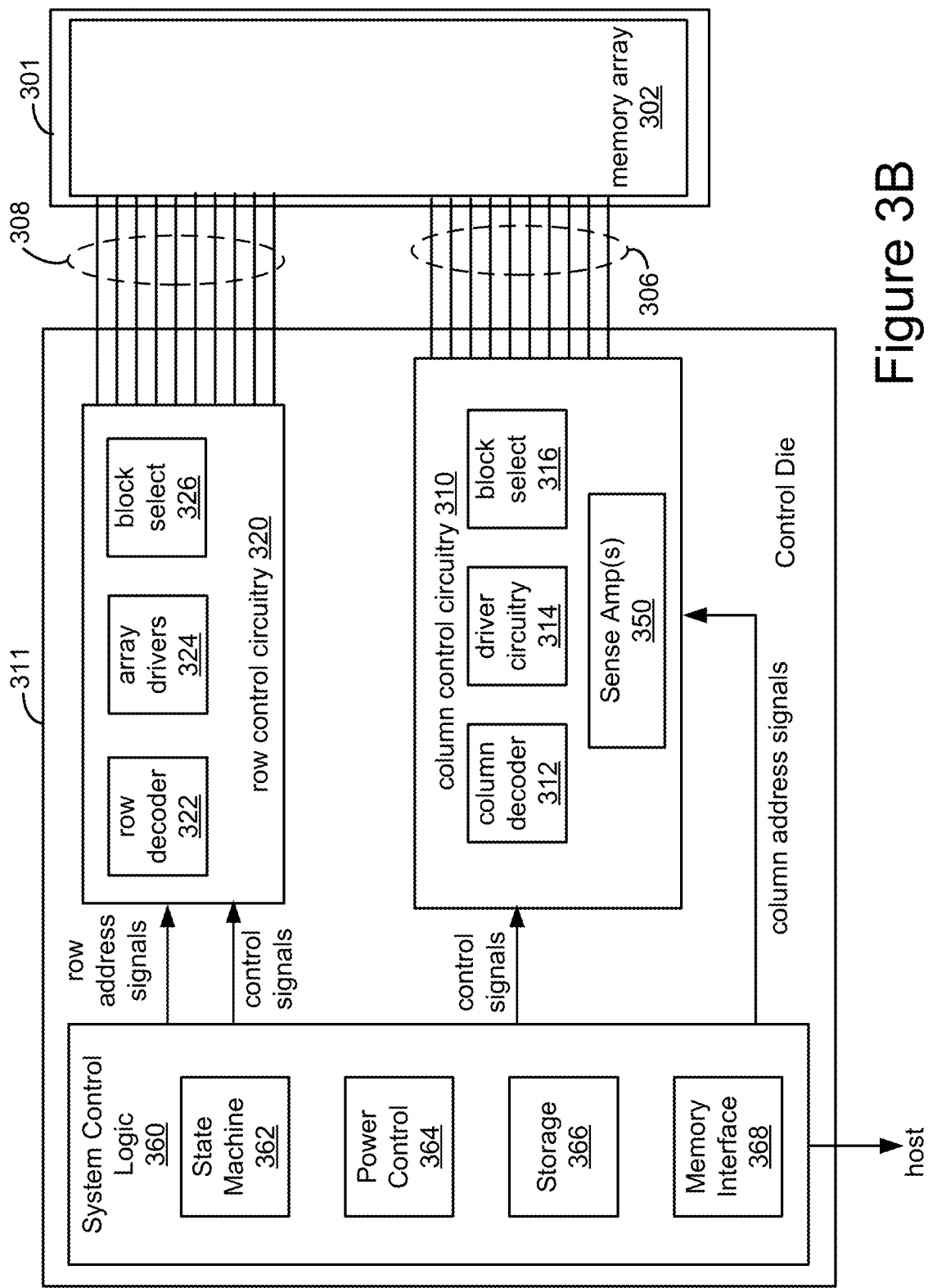
FIG. 3B is a functional block diagram of an embodiment of an integrated memory assembly.

FIG. 3B shows an alternative arrangement to that of FIG. 3A which may be implemented using wafer-to-wafer bonding to provide a bonded die pair. FIG. 3B depicts a functional block diagram of one embodiment of an integrated memory assembly 307. The integrated memory assembly 307 may be used in a memory package 104 in storage system 100. The integrated memory assembly 307 includes two types of semiconductor die (or more succinctly, "die"). Memory structure die 301 includes memory structure 302. Memory structure 302 may contain non-volatile memory cells. Control die 311 includes control circuitry 360, 310, 320. In some embodiments, the control die 311 is configured to connect to the memory structure 302 in the memory structure die 301. In some embodiments, the memory structure die 301 and the control die 311 are bonded together.

FIG. 3B shows an example of the peripheral circuitry, including control circuits, formed in a peripheral circuit or control die 311 coupled to memory structure 302 formed in memory structure die 301. Common components are labelled similarly to FIG. 3A. It can be seen that system control logic 360, row control circuitry 320, and column control circuitry 310 are located in control die 311. In some embodiments, all or a portion of the column control circuitry 310 and all or a portion of the row control circuitry 320 are located on the memory structure die 301. In some embodiments, some of the circuitry in the system control logic 360 is located on the on the memory structure die 301.

System control logic 360, row control circuitry 320, and column control circuitry 310 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 310). Thus, while moving such circuits from a die such as memory structure die 301 may reduce the number of steps needed to fabricate such a die, adding such circuits to a die such as control die 311 may not require any additional process steps. The control die 311 could also be referred to as a CMOS die, due to the use of CMOS technology to implement some or all of control circuitry 360, 310, 320.

FIG. 3B shows column control circuitry 310 including sense amplifier(s) 350 on the control die 311 coupled to memory structure 302 on the memory structure die 301 through electrical paths 306. For example, electrical paths 306 may provide electrical connection between column decoder 312, driver circuitry 314, and block select 316 and bit lines of memory structure 302. Electrical paths may extend from column control circuitry 310 in control die 311 through pads on control die 311 that are bonded to corresponding pads of the memory structure die 301, which are connected to bit lines of memory structure 302. Each bit line of memory structure 302 may have a corresponding electrical path in electrical paths 306, including a pair of bond pads, which connects to column control circuitry 310. Similarly, row control circuitry 320, including row decoder 322, array drivers 324, and block select 326 are coupled to memory structure 302 through electrical paths 308. Each electrical path 308 may correspond to a word line, dummy word line, or select gate line. Additional electrical paths may also be provided between control die 311 and memory structure die 301.

For purposes of this document, the phrase "one or more control circuits" can include one or more of controller 102, system control logic 360, column control circuitry 310, row control circuitry 320, a micro-controller, a state machine, and/or other control circuitry, or other analogous circuits that are used to control non-volatile memory. The one or more control circuits can include hardware only or a combination of hardware and software (including firmware). For example, a controller programmed by firmware to perform the functions described herein is one example of a control circuit. A control circuit can include a processor, FGA, ASIC, integrated circuit, or other type of circuit.

Figure 4:
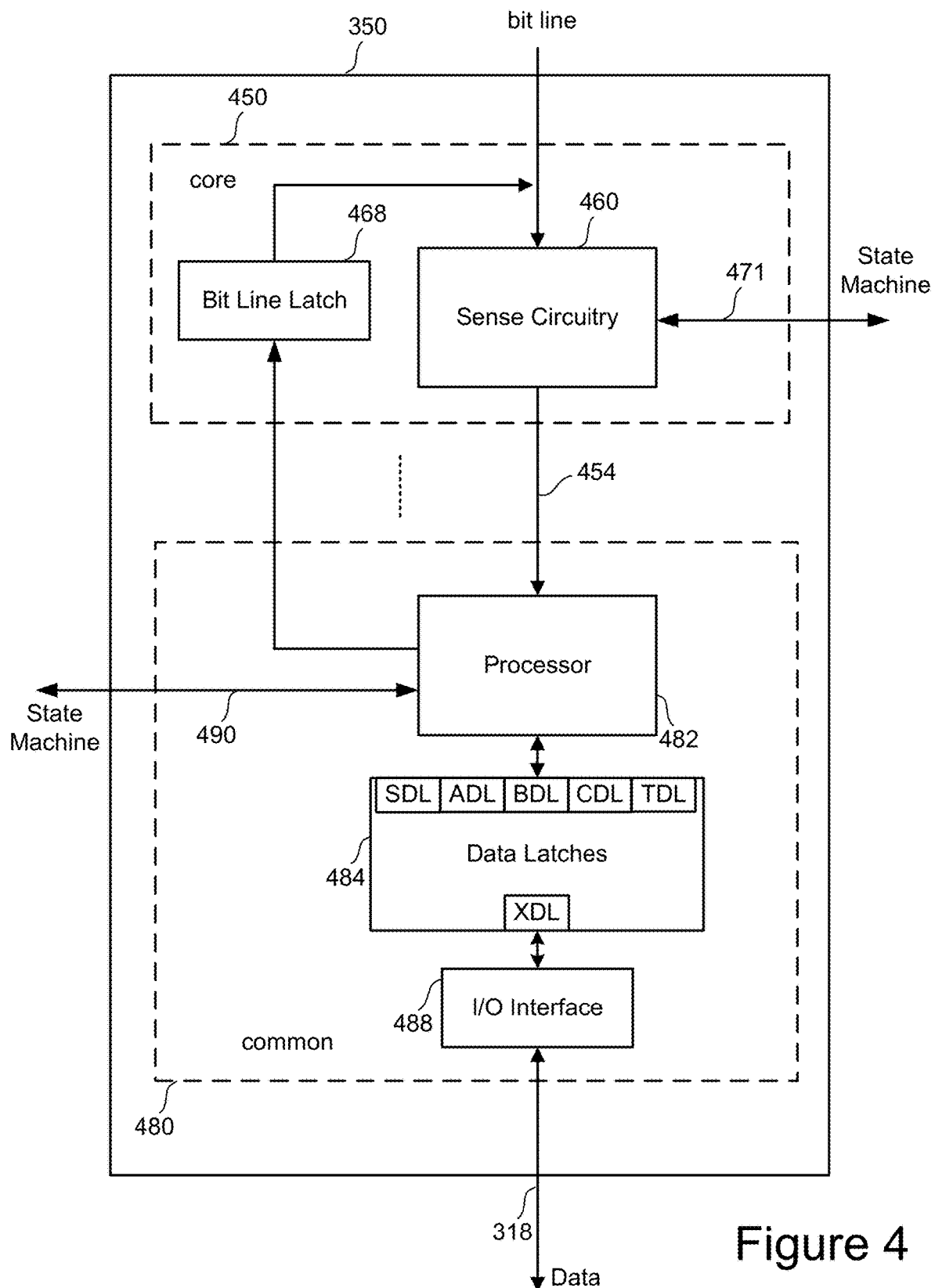
FIG. 4 is a block diagram of an individual sense block partitioned into a core portion and a common portion.

FIG. 4 is a block diagram of an individual sense block of sense amplifiers 350 partitioned into a core portion, referred to as a sense module 480, and a common portion 480. In one embodiment, there will be a separate sense module 450 for each bit line and one common portion 480 for a set of multiple sense modules 450. In one example, a sense block will include one common portion 480 and eight sense, twelve, or sixteen modules 450. Each of the sense modules in a group will communicate with the associated common portion via a data bus 454.

Sense module 450 comprises sense circuitry 460 that determines whether a conduction current in a connected bit line is above or below a predetermined level or, in voltage based sensing, whether a voltage level in a connected bit line is above or below a predetermined level. The sense circuitry 460 is to receive control signals from the state machine via input lines 471. In some embodiments, sense module 450 includes a circuit commonly referred to as a sense amplifier. Sense module 450 also includes a bit line latch 468 that is used to set a voltage condition on the connected bit line. For example, a predetermined state latched in bit line latch 468 will result in the connected bit line being pulled to a state designating program inhibit (e.g., VDD).

Common portion 480 comprises a processor 468, a set of data latches 484 and an I/O Interface 488 coupled between the set of data latches 484 and data bus 318. Processor 482 performs computations. For example, one of its functions is to determine the data stored in the sensed memory cell and store the determined data in the set of data latches. The set of data latches 484 is used to store data bits determined by processor 468 during a read operation. It is also used to store data bits imported from the data bus 318 during a program operation. The imported data bits represent write data meant to be programmed into the memory. I/O interface 488 provides an interface between data latches 484 and the data bus 318.

During read or sensing, the operation of the system is under the control of state machine 362 that controls (using power control 364) the supply of different control gate or other bias voltages to the addressed memory cell(s). As it steps through the various predefined control gate voltages corresponding to the various memory states supported by the memory, the sense module 450 may trip at one of these voltages and an output will be provided from sense module 450 to processor 468 via bus 454. At that point, processor 468 determines the resultant memory state by consideration of the tripping event(s) of the sense module and the information about the applied control gate voltage from the state machine via input lines 490. It then computes a binary encoding for the memory state and stores the resultant data bits into data latches 484. In another embodiment of the core portion, bit line latch 468 serves double duty, both as a latch for latching the output of the sense module 450 and also as a bit line latch as described above.

Data latch stack 484 contains a stack of data latches corresponding to the sense module. In one embodiment, there are three, four or another number of data latches per sense module 450. In one embodiment, the latches are each one bit. In this document, the latches in one embodiment of data latch stack 484 will be referred to as SDL, XDL, ADL, BDL, and CDL. In the embodiments discussed here, the latch XDL is a transfer latch used to exchange data with the I/O interface 488. In addition to a first sense amp data latch SDL, the additional latches ADL, BDL and CDL can be used to hold multi-state data, where the number of such latches typically reflects the number of bits stored in a memory cell. For example, in 3-bit per cell multi-level cell (MLC) memory format, the three sets of latches ADL, BDL, CDL can be used for upper, middle, lower page data. In a 2-bit per cell embodiment, only ADL and BDL might be used, while a 4-bit per cell MLC embodiment might include a further set of DDL latches. In other embodiments, the XDL latches can be used to hold additional pages of data, such as a 4-bit per cell MLC embodiment the uses the XDL latches in addition to the three sets of latches ADL, BDL, CDL for four pages of data. The following discussion will mainly focus on a 3-bit per cell embodiment, as this can illustrate the main features but not get overly complicated, but the discussion can also be applied to embodiments with more or fewer bit per cell formats. Some embodiments many also include additional latches for particular functions, such as represented by the TDL latch where, for example, this could be used in "quick pass write" operations where it is used in program operations for when a memory cell is approaching its target state and is partially inhibited to slow its programming rate. In embodiments discussed below, the latches ADL, BDL, . . . can transfer data between themselves and the bit line latch 468 and with the transfer latch XDL, but not directly with the I/O interface 488, so that a transfer from these latches to the I/O interface is transferred by way of the XDL latches.

For example, in some embodiments data read from a memory cell or data to be programmed into a memory cell will first be stored in XDL. In case the data is to be programmed into a memory cell, the system can program the data into the memory cell from XDL. In one embodiment, the data is programmed into the memory cell entirely from XDL before the next operation proceeds. In other embodiments, as the system begins to program a memory cell through XDL, the system also transfers the data stored in XDL into ADL in order to reset XDL. Before data is transferred from XDL into ADL, the data kept in ADL is transferred to BDL, flushing out whatever data (if any) is being kept in BDL, and similarly for BDL and CDL. Once data has been transferred from XDL into ADL, the system continues (if necessary) to program the memory cell through ADL, while simultaneously loading the data to be programmed into a memory cell on the next word line into XDL, which has been reset. By performing the data load and programming operations simultaneously, the system can save time and thus perform a sequence of such operations faster.

During program or verify, the data to be programmed is stored in the set of data latches 484 from the data bus 318. During the verify process, Processor 468 monitors the verified memory state relative to the desired memory state. When the two are in agreement, processor 468 sets the bit line latch 468 so as to cause the bit line to be pulled to a state designating program inhibit. This inhibits the memory cell coupled to the bit line from further programming even if it is subjected to programming pulses on its control gate. In other embodiments the processor initially loads the bit line latch 468 and the sense circuitry sets it to an inhibit value during the verify process.

In some implementations (but not required), the data latches are implemented as a shift register so that the parallel data stored therein is converted to serial data for data bus 318, and vice versa. In one preferred embodiment, all the data latches corresponding to the read/write block of m memory cells can be linked together to form a block shift register so that a block of data can be input or output by serial transfer. In particular, the bank of read/write modules is adapted so that each of its set of data latches will shift data in to or out of the data bus in sequence as if they are part of a shift register for the entire read/write block.

Figure 5:
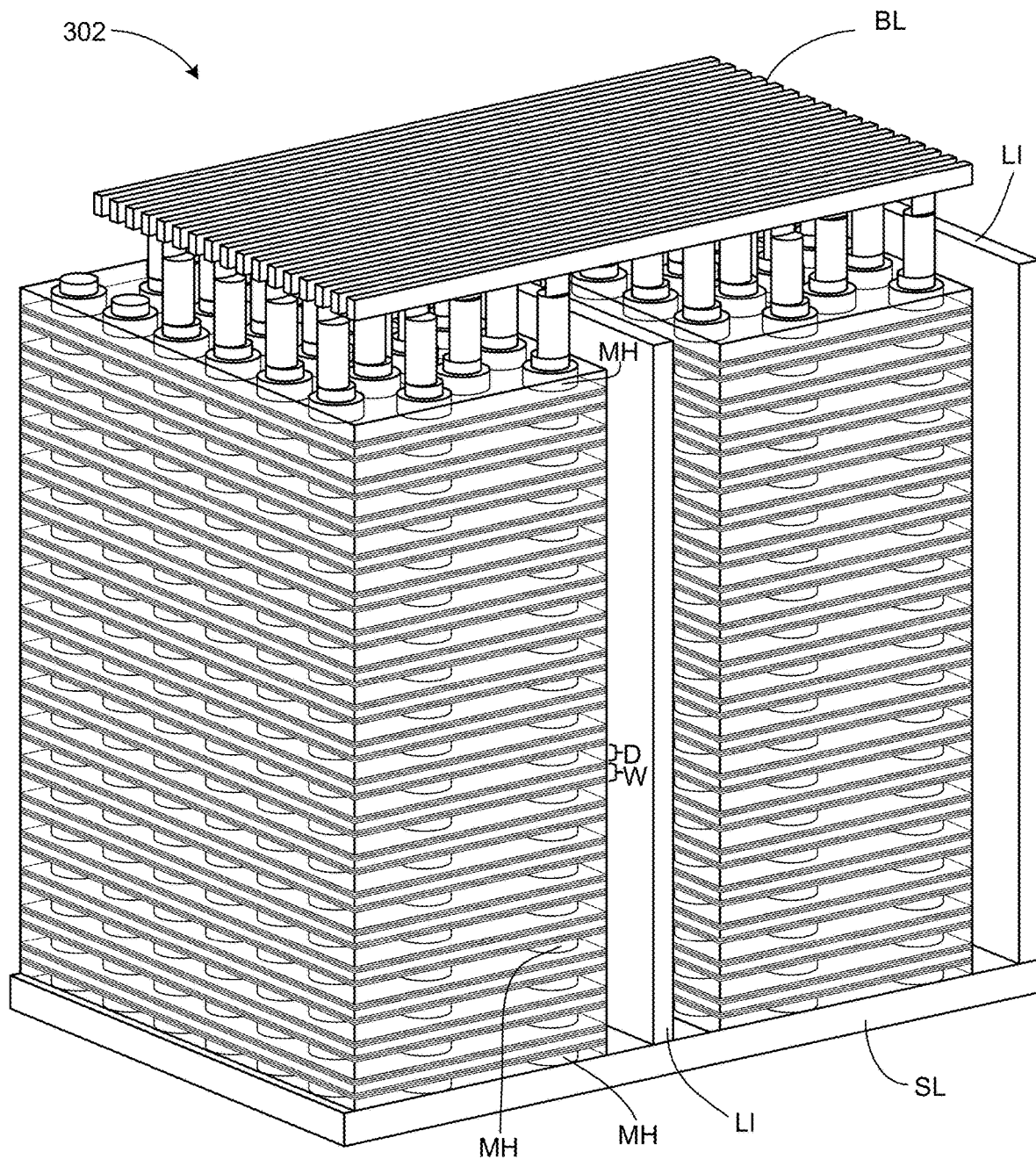
FIG. 5 is a perspective view of a portion of one example embodiment of a monolithic three dimensional memory array that can comprise memory structure.

FIG. 5 is a perspective view of a portion of one example embodiment of a monolithic three dimensional memory array that can comprise memory structure 302, which includes a plurality non-volatile memory cells. For example, FIG. 5 shows a portion of one block comprising memory. The structure depicted includes a set of bit lines BL positioned above a stack of alternating dielectric layers and conductive layers with vertical columns of materials extending through the dielectric layers and conductive layers. For example purposes, one of the dielectric layers is marked as D and one of the conductive layers (also called word line layers) is marked as W. The word line layers contain one or more word lines that are connected to memory cells. For example, a word line may be connected to a control gate of a memory cell. The number of alternating dielectric layers and conductive layers can vary based on specific implementation requirements. One set of embodiments includes between 108-304 alternating dielectric layers and conductive layers. One example embodiment includes 96 data word line layers, 8 select layers, 6 dummy word line layers and 110 dielectric layers. More or fewer than 108-304 layers can also be used. The alternating dielectric layers and conductive layers are divided into multiple "fingers" or sub-blocks by local interconnects LI, in an embodiment. FIG. 5 shows two fingers and two local interconnects LI. Below the alternating dielectric layers and word line layers is a source line layer SL. Vertical columns of materials (also known as memory holes) are formed in the stack of alternating dielectric layers and conductive layers. For example, one of the vertical columns/memory holes is marked as MH. Note that in FIG. 5, the dielectric layers are depicted as see-through so that the reader can see the memory holes positioned in the stack of alternating dielectric layers and conductive layers. In one embodiment, NAND strings are formed by filling the vertical column/memory hole with materials including a charge-trapping material to create a vertical column of memory cells. Each memory cell can store one or more bits of data.

Figure 6A:
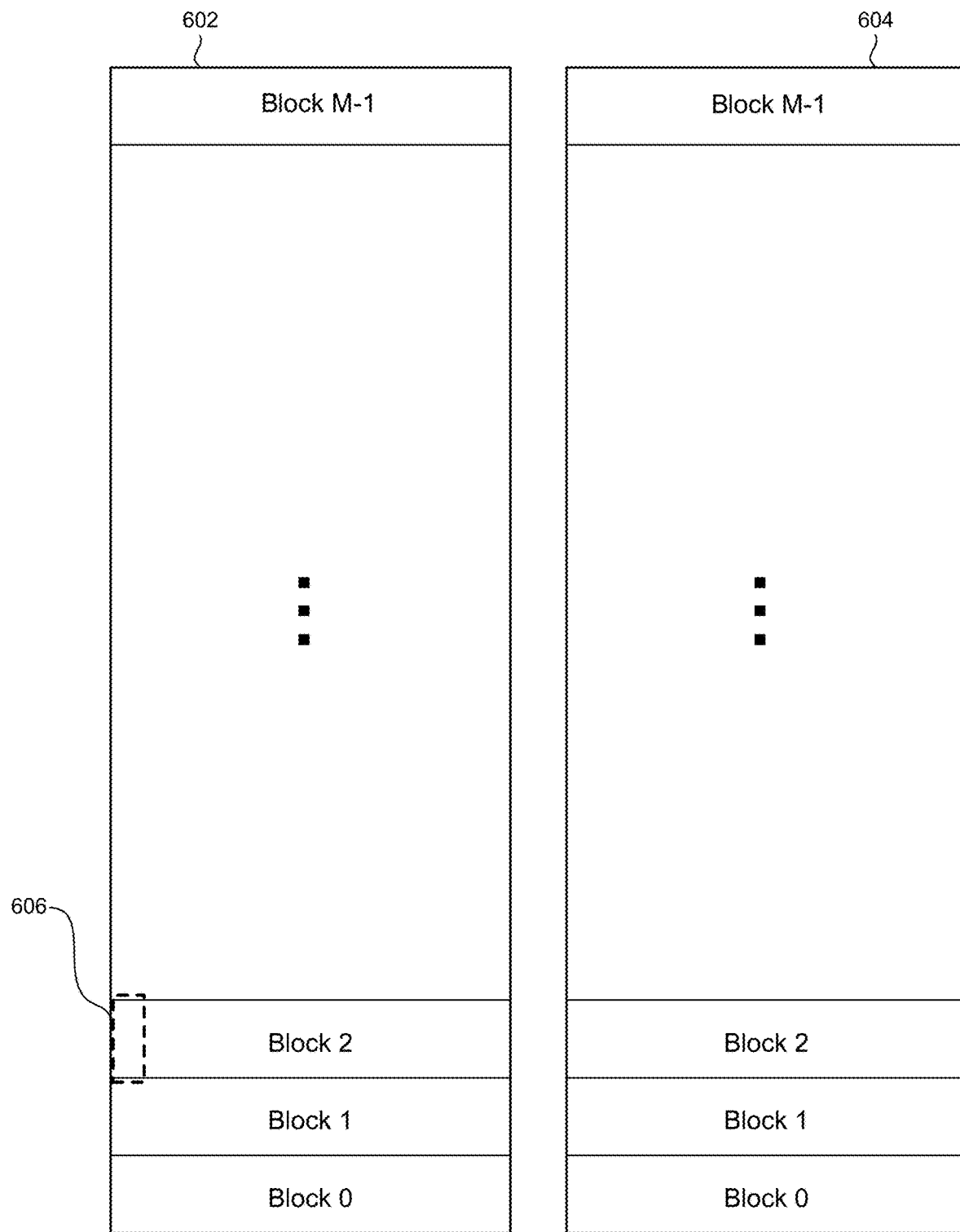
FIG. 6A is a block diagram explaining one example of the organization of memory structure.

FIG. 6A is a block diagram explaining one example organization of memory structure 302, which is divided into two planes 602 and 604. Each plane is then divided into M blocks. In one example, each plane has about 2000 blocks. However, different numbers of blocks and planes can also be used. In one embodiment, for two plane memory, the block IDs are usually such that even blocks belong to one plane and odd blocks belong to another plane; therefore, plane 602 includes block 0, 2, 4, 6, . . . and plane 604 includes blocks 1, 3, 5, 7, . . . . In on embodiment, a block of memory cells is a unit of erase. That is, all memory cells of a block are erased together. In other embodiments, memory cells can be grouped into blocks for other reasons, such as to organize the memory structure 302 to enable the signaling and selection circuits.

Figure 6B:
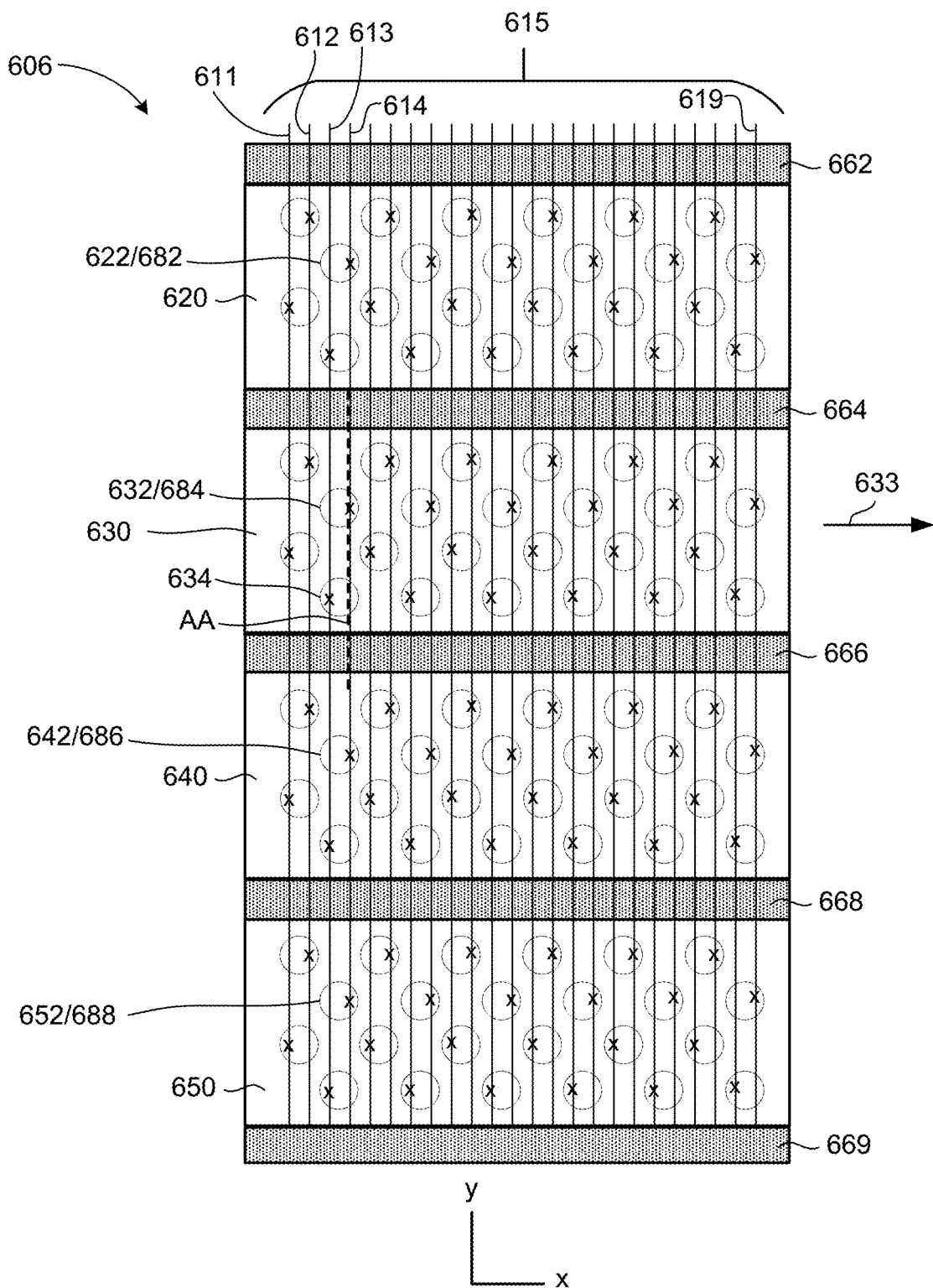
FIG. 6B is a block diagram depicting a top view of a portion of one block from the memory structure.
Figure 6C:
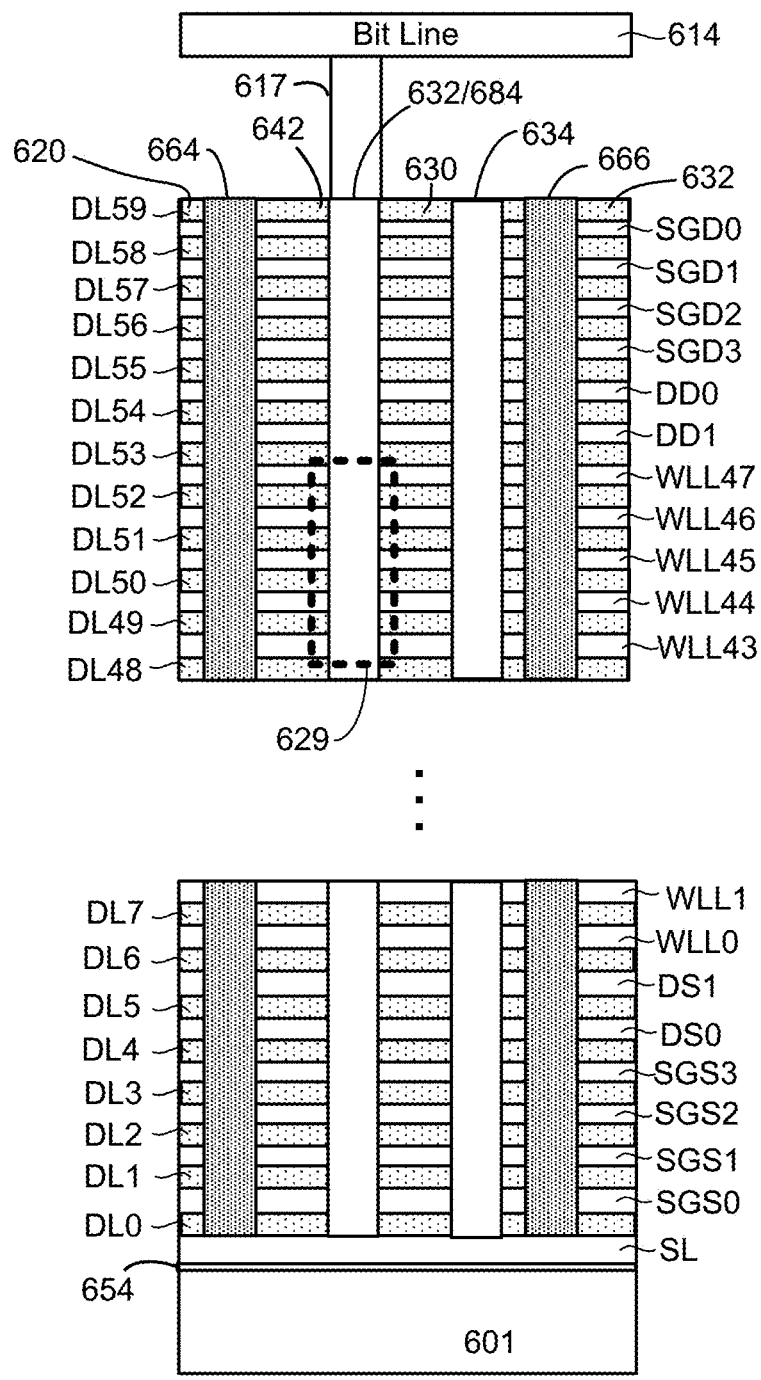
FIG. 6C depicts a portion of an embodiment of three dimensional memory structure showing a cross-sectional view along line AA of FIG. 6B.
Figure 6D:
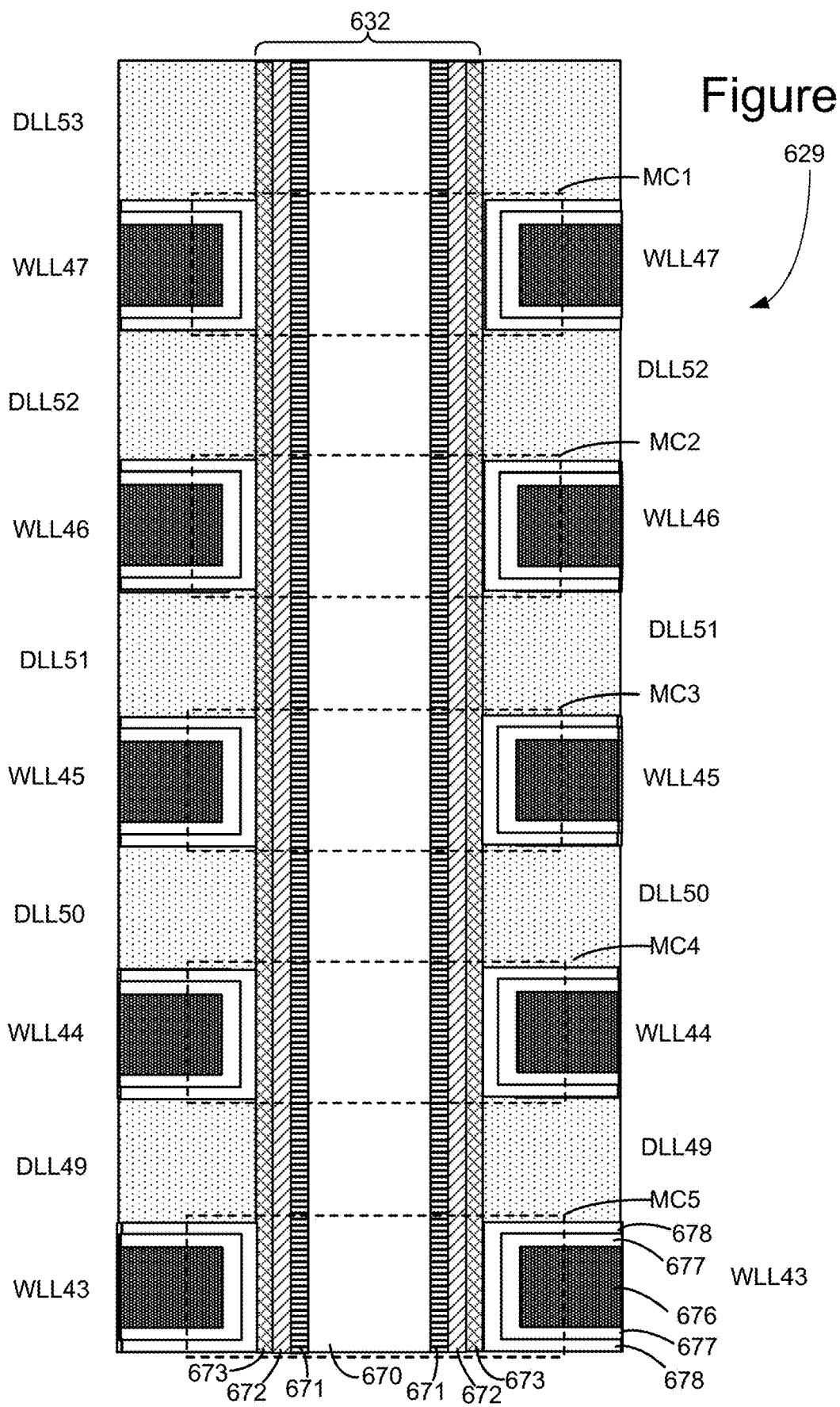
FIG. 6D depicts a cross sectional view of region of FIG. 6C that includes a portion of a vertical column.

FIGS. 6B-6D depict an example 3D NAND structure. FIG. 6B is a block diagram depicting a top view of a portion of one block from memory structure 302. The portion of the block depicted in FIG. 6B corresponds to portion 606 in block 2 of FIG. 6A. As can be seen from FIG. 6B, the block depicted in FIG. 6B extends in the direction of 633. In one embodiment, the memory array will have 60 layers. Other embodiments have less than or more than 60 layers. However, FIG. 6B only shows the top layer.

FIG. 6B depicts a plurality of circles that represent the vertical columns. Each of the vertical columns includes multiple select transistors and multiple memory cells. In one embodiment, each vertical column implements a NAND string. For example, FIG. 6B depicts vertical columns 622, 632, 642 and 652. Vertical column 622 implements NAND string 682. Vertical column 632 implements NAND string 684. Vertical column 642 implements NAND string 686. Vertical column 652 implements NAND string 688. More details of the vertical columns are provided below. Since the block depicted in FIG. 6B extends in the direction of arrow 633 and in the direction of arrow 633, the block includes more vertical columns than depicted in FIG. 6B.

FIG. 6B also depicts a set of bit lines 615, including bit lines 611, 612, 613, 614, . . . , 619. FIG. 6B shows twenty-four bit lines because only a portion of the block is depicted. It is contemplated that more than twenty-four bit lines connected to vertical columns of the block. Each of the circles representing vertical columns has an "x" to indicate its connection to one bit line. For example, bit line 614 is connected to vertical columns 622, 632, 642 and 652.

The block depicted in FIG. 6B includes a set of local interconnects 662, 664, 666, 668 and 669 that connect the various layers to a source line below the vertical columns. Local interconnects 662, 664, 666, 668 and 669 also serve to divide each layer of the block into four regions; for example, the top layer depicted in FIG. 6B is divided into regions 620, 630, 640 and 650, which are referred to as fingers or sub-blocks. In the layers of the block that implement memory cells, the four regions are referred to as word line sub-blocks that are separated by the local interconnects. In one embodiment, the word line sub-blocks on a common level of a block connect together at the end of the block to form a single word line. In another embodiment, the word line sub-blocks on the same level are not connected together. In one example implementation, a bit line only connects to one vertical column in each of regions 620, 630, 640 and 650. In that implementation, each block has sixteen rows of active columns and each bit line connects to four rows in each block. In one embodiment, all of four rows connected to a common bit line are connected to the same word line (via different word line sub-blocks on the same level that are connected together); therefore, the system uses the source side select lines and the drain side select lines to choose one (or another subset) of the four to be subjected to a memory operation (program, verify, read, and/or erase).

Although FIG. 6B shows each region having four rows of vertical columns, four regions and sixteen rows of vertical columns in a block, those exact numbers are an example implementation. Other embodiments may include more or fewer regions per block, more or fewer rows of vertical columns per region and more or fewer rows of vertical columns per block.

FIG. 6B also shows the vertical columns being staggered. In other embodiments, different patterns of staggering can be used. In some embodiments, the vertical columns are not staggered.

FIG. 6C depicts a portion of an embodiment of three dimensional memory structure 302 showing a cross-sectional view along line AA of FIG. 6B. This cross sectional view cuts through vertical columns 632 and 634 and region 630 (see FIG. 6B). The structure of FIG. 6C includes four drain side select layers SGD0, SGD1, SGD2 and SGD3; four source side select layers SGS0, SGS1, SGS2 and SGS3; four dummy word line layers DD0, DD1, DS0 and DS1; and forty-eight data word line layers WLL0-WLL47 for connecting to data memory cells. Other embodiments can implement more or less than four drain side select layers, more or less than four source side select layers, more or fewer than four dummy word line layers, and more or fewer than forty eight word line layers (e.g., 96 word line layers). Vertical columns 632 and 634 are depicted protruding through the drain side select layers, source side select layers, dummy word line layers and word line layers. In one embodiment, each vertical column comprises a NAND string. For example, vertical column 632 comprises NAND string 684. Below the vertical columns and the layers listed below is substrate 601, an insulating film 654 on the substrate, and source line SL. The NAND string of vertical column 632 has a source end at a bottom of the stack and a drain end at a top of the stack. As in agreement with FIG. 6B, FIG. 6C show vertical column 632 connected to Bit Line 614 via connector 617. Local interconnects 664 and 666 are also depicted.

For ease of reference, drain side select layers SGD0, SGD1, SGD2 and SGD3; source side select layers SGS0, SGS1, SGS2 and SGS3; dummy word line layers DD0, DD1, DS0 and DS1; and word line layers WLL0-WLL47 collectively are referred to as the conductive layers. In one embodiment, the conductive layers are made from a combination of TiN and tungsten. In other embodiments, other materials can be used to form the conductive layers, such as doped polysilicon, metal such as tungsten or metal silicide. In some embodiments, different conductive layers can be formed from different materials. Between conductive layers are dielectric layers DL0-DL59. For example, dielectric layers DL49 is above word line layer WLL43 and below word line layer WLL44. In one embodiment, the dielectric layers are made from $SiO_2$. In other embodiments, other dielectric materials can be used to form the dielectric layers.

The non-volatile memory cells are formed along vertical columns which extend through alternating conductive and dielectric layers in the stack. In one embodiment, the memory cells are arranged in NAND strings. The word line layers WLL0-WLL47 connect to memory cells (also called data memory cells). Dummy word line layers DD0, DD1, DS0 and DS1 connect to dummy memory cells. A dummy memory cell does not store user data, while a data memory cell is eligible to store user data. Drain side select layers SGD0, SGD1, SGD2 and SGD3 are used to electrically connect and disconnect NAND strings from bit lines. Source side select layers SGS0, SGS1, SGS2 and SGS3 are used to electrically connect and disconnect NAND strings from the source line SL.

In some embodiments, the word lines are read sequentially, which means that the word lines are read either from low to high (e.g., WLL0 to WLL47) or from high to low (e.g., WLL47 to WLL0). It is not required to read the entire set of word lines when reading sequentially. Techniques are disclosed herein for providing compensation for interference caused by adjacent memory cells on target memory cells during a sequential read.

In some embodiments, the read of an individual word line is broken down into separate reads of sub-blocks. Referring again to FIG. 6B, the block is divided into four sub-blocks 620, 630, 640, 650. Thus, the four sub-blocks on one word line layer may be read, prior to reading the four sub-blocks on an adjacent word line layer. In some embodiments, data state information is used to provide compensation on a sub-block basis. For example, data state information for memory cells at WLL35 is kept for each of the four sub-blocks 620-650. Then, when reading sub-block 620 at WLL36 the data state information for sub-block 620 at WLL35 is used to compensate for interference from adjacent memory cells in sub-block 620 at WLL35, when reading sub-block 630 at WLL36 the data state information for sub-block 630 at WLL35 is used to compensate for interference from adjacent memory cells in sub-block 620 at WLL35, etc.

FIG. 6D depicts a cross sectional view of region 629 of FIG. 6C that includes a portion of vertical column 632. In one embodiment, the vertical columns are round and include four layers; however, in other embodiments more or less than four layers can be included and other shapes can be used. In one embodiment, vertical column 632 includes an inner core layer 670 that is made of a dielectric, such as $SiO_2$. Other materials can also be used. Surrounding inner core 670 is polysilicon channel 671. Materials other than polysilicon can also be used. Note that it is the channel 671 that connects to the bit line. Surrounding channel 671 is a tunneling dielectric 672. In one embodiment, tunneling dielectric 672 has an ONO structure. Surrounding tunneling dielectric 672 is charge trapping layer 673, such as (for example) Silicon Nitride. Other memory materials and structures can also be used. The technology described herein is not limited to any particular material or structure.

FIG. 6D depicts dielectric layers DLL49, DLL50, DLL51, DLL52 and DLL53, as well as word line layers WLL43, WLL44, WLL45, WLL46, and WLL47. Each of the word line layers includes a word line region 676 surrounded by an aluminum oxide layer 677, which is surrounded by a blocking oxide ($SiO_2$) layer 678. The physical interaction of the word line layers with the vertical column forms the memory cells. Thus, a memory cell, in one embodiment, comprises channel 671, tunneling dielectric 672, charge trapping layer 673, blocking oxide layer 678, aluminum oxide layer 677 and word line region 676. For example, word line layer WLL47 and a portion of vertical column 632 comprise a memory cell MC1. Word line layer WLL46 and a portion of vertical column 632 comprise a memory cell MC2. Word line layer WLL45 and a portion of vertical column 632 comprise a memory cell MC3. Word line layer WLL44 and a portion of vertical column 632 comprise a memory cell MC4. Word line layer WLL43 and a portion of vertical column 632 comprise a memory cell MC5. In other architectures, a memory cell may have a different structure; however, the memory cell would still be the storage unit.

Note that the charge trapping layer 673 may extend from one end of the NAND string to the other, and hence may be referred to herein as a continuous charge trapping layer. When a memory cell is programmed, electrons are stored in a portion of the charge trapping layer 673 which is associated with the memory cell. These electrons are drawn into the charge trapping layer 673 from the channel 671, through the tunneling dielectric 672, in response to an appropriate voltage on word line region 676. The Vt of a memory cell is increased in proportion to the amount of stored charge. In one embodiment, the programming is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as gate induced drain leakage (GIDL).

Figure 6E:
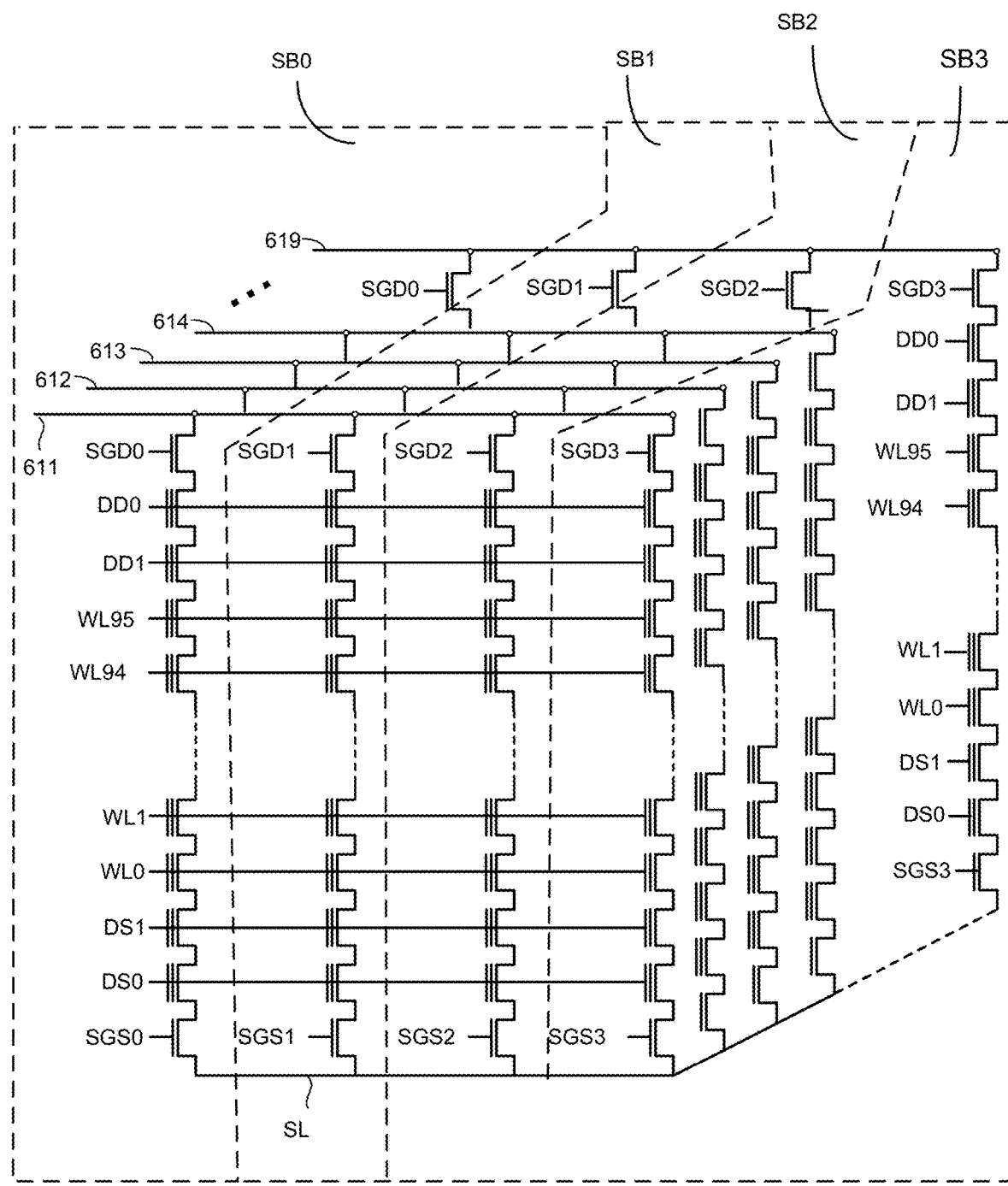
FIG. 6E is a schematic of a plurality of NAND strings showing multiple sub-blocks.

FIG. 6E is a schematic diagram of a portion of the memory depicted in FIGS. 5-6D. FIG. 6E shows physical word lines WLL0-WLL95 running across the entire block. The structure of FIG. 6E corresponds to portion 606 in Block 2 of FIGS. 5-6D, including bit lines 611, 612, 613, 614, . . . , 619. Within the block, each bit line is connected to four NAND strings. Drain side selection lines SGD0, SGD1, SGD2 and SGD3 are used to determine which of the four NAND strings connect to the associated bit line(s). Source side selection lines SGS0, SGS1, SGS2 and SGS3 are used to determine which of the four NAND strings connect to the common source line. The block can also be thought of as divided into four sub-blocks SB0, SB1, SB2 and SB3. Sub-block SB0 corresponds to those vertical NAND strings controlled by SGD0 and SGS0, sub-block SB1 corresponds to those vertical NAND strings controlled by SGD1 and SGS1, sub-block SB2 corresponds to those vertical NAND strings controlled by SGD2 and SGS2, and sub-block SB3 corresponds to those vertical NAND strings controlled by SGD3 and SGS3.

Although the example memory system of FIGS. 5-6E is a three dimensional memory structure that includes vertical NAND strings with charge-trapping material, other (2D and 3D) memory structures (e.g., MRAM, ReRAM, PCM) can also be used with the technology described herein.

The memory systems discussed above can be erased, programmed and read. At the end of a successful programming process (with verification), the threshold voltages of the memory cells should be within one or more distributions of threshold voltages for programmed memory cells or within a distribution of threshold voltages for erased memory cells, as appropriate.

FIG. 7A is a graph of threshold voltage versus number of memory cells, and illustrates example threshold voltage distributions for the memory array when each memory cell stores one bit of data. FIG. 7A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." Memory cells that store one bit of data are referred to as single level cells ("SLC").

FIG. 7B is a graph of threshold voltage versus number of memory cells, and illustrates example threshold voltage distributions for the memory array when each memory cell stores three bits of data. Other embodiments, however, may use other data capacities per memory cell (e.g., such as one, two, four, or five bits of data per memory cell). Memory cells that store more than one bit of data are referred to as multi-level cells ("MLC"). FIG. 7B shows eight threshold voltage distributions, corresponding to eight data states. For a data state N, that data state N has higher threshold voltages than data state N−1 and lower threshold voltages than data state N+1. The first threshold voltage distribution (data state) S0 represents memory cells that are erased. The other seven threshold voltage distributions (data states) S1-S7 represent memory cells that are programmed and, therefore, are also called programmed data states. In some embodiments, data states S1-S7 can overlap, with controller 122 relying on error correction to identify the correct data being stored.

FIG. 7B shows seven read reference voltages, Vr1, Vr2, Vr3, Vr4, Vr5, Vr6, and Vr7 for reading data from memory cells. By testing (e.g., performing sense operations) whether the threshold voltage of a given memory cell is above or below the seven read reference voltages, the system can determine what data state (i.e., S0, S1, S2, S3, . . . ) a memory cell is in. In FIG. 7A, read reference voltage Vr is used to test whether memory cells are erased or programmed.

FIG. 7B also shows seven verify reference voltages, Vv1, Vv2, Vv3, Vv4, Vv5, Vv6, and Vv7 (also referred to as verify target voltages). When programming memory cells to data state S1, the system will test whether those memory cells have a threshold voltage greater than or equal to Vv1. When programming memory cells to data state S2, the system will test whether the memory cells have threshold voltages greater than or equal to Vv2. When programming memory cells to data state S3, the system will determine whether memory cells have their threshold voltage greater than or equal to Vv3. When programming memory cells to data state S4, the system will test whether those memory cells have a threshold voltage greater than or equal to Vv4. When programming memory cells to data state S5, the system will test whether those memory cells have a threshold voltage greater than or equal to Vv5. When programming memory cells to data state S6, the system will test whether those memory cells have a threshold voltage greater than or equal to Vv6. When programming memory cells to data state S7, the system will test whether those memory cells have a threshold voltage greater than or equal to Vv7.

In one embodiment, known as full sequence programming, memory cells can be programmed from the erased data state S0 directly to any of the programmed data states S1-S7. For example, a population of memory cells to be programmed may first be erased so that all memory cells in the population are in erased data state S0. Then, a programming process is used to program memory cells directly into data states S1, S2, S3, S4, S5, S6, and/or S7. For example, while some memory cells are being programmed from data state S0 to data state S1, other memory cells are being programmed from data state S0 to data state S2 and/or from data state S0 to data state S3, and so on. The arrows of FIG. 7B represent the full sequence programming. The technology described herein can also be used with other types of programming in addition to full sequence programming including (but not limited to) multiple stage/phase programming.

Each threshold voltage distribution (data state) of FIG. 7B corresponds to predetermined values for the set of data bits stored in the memory cells. The specific relationship between the data programmed into the memory cell and the threshold voltage levels of the memory cell depends upon the data encoding scheme adopted for the memory cells. In one embodiment, data values are assigned to the threshold voltage ranges using a Gray code assignment so that if the threshold voltage of a memory erroneously shifts to its neighboring physical state, only one bit will be affected.

FIG. 7C is a table describing one example of an assignment of data values to data states. In the table of FIG. 7B, S0=111 (erased state), S1=110, S2=100, S3=000, S4=010, S5=011, S6=001 and S7=101. Other encodings of data can also be used. No particular data encoding is required by the technology disclosed herein. In one embodiment, when a block is subjected to an erase operation, all memory cells are moved to data state S0, the erased state. Referring back to FIG. 4, in one embodiment the ADL, BDL, and CDL data latches can respectively be used for the lower, middle, and upper page data values of a memory cell during a program operation.

In general, during verify operations and read operations, the selected word line is connected to a voltage (one example of a reference signal), a level of which is specified for each read operation (e.g., see read reference voltages Vr1, Vr2, Vr3, Vr4, Vr5, Vr6, and Vr7, of FIG. 6) or verify operation (e.g. see verify reference voltages Vv1, Vv2, Vv3, Vv4, Vv5, Vv6, and Vv7 of FIG. 6) in order to determine whether a threshold voltage of the concerned memory cell has reached such level. After applying the word line voltage, the conduction current of the memory cell is measured to determine whether the memory cell turned on (conducted current) in response to the voltage applied to the word line. If the conduction current is measured to be greater than a certain value, then it is assumed that the memory cell turned on and the voltage applied to the word line is greater than the threshold voltage of the memory cell. If the conduction current is not measured to be greater than the certain value, then it is assumed that the memory cell did not turn on and the voltage applied to the word line is not greater than the threshold voltage of the memory cell. During a read or verify process, the unselected memory cells are provided with one or more read pass voltages (also referred to as bypass voltages) at their control gates so that these memory cells will operate as pass gates (e.g., conducting current regardless of whether they are programmed or erased).

There are many ways to measure the conduction current of a memory cell during a read or verify operation. In one example, the conduction current of a memory cell is measured by the rate it discharges or charges a dedicated capacitor in the sense amplifier. In another example, the conduction current of the selected memory cell allows (or fails to allow) the NAND string that includes the memory cell to discharge a corresponding bit line. The voltage on the bit line is measured after a period of time to see whether it has been discharged or not. Note that the technology described herein can be used with different methods known in the art for verifying/reading. Other read and verify techniques known in the art can also be used.

Figure 8:
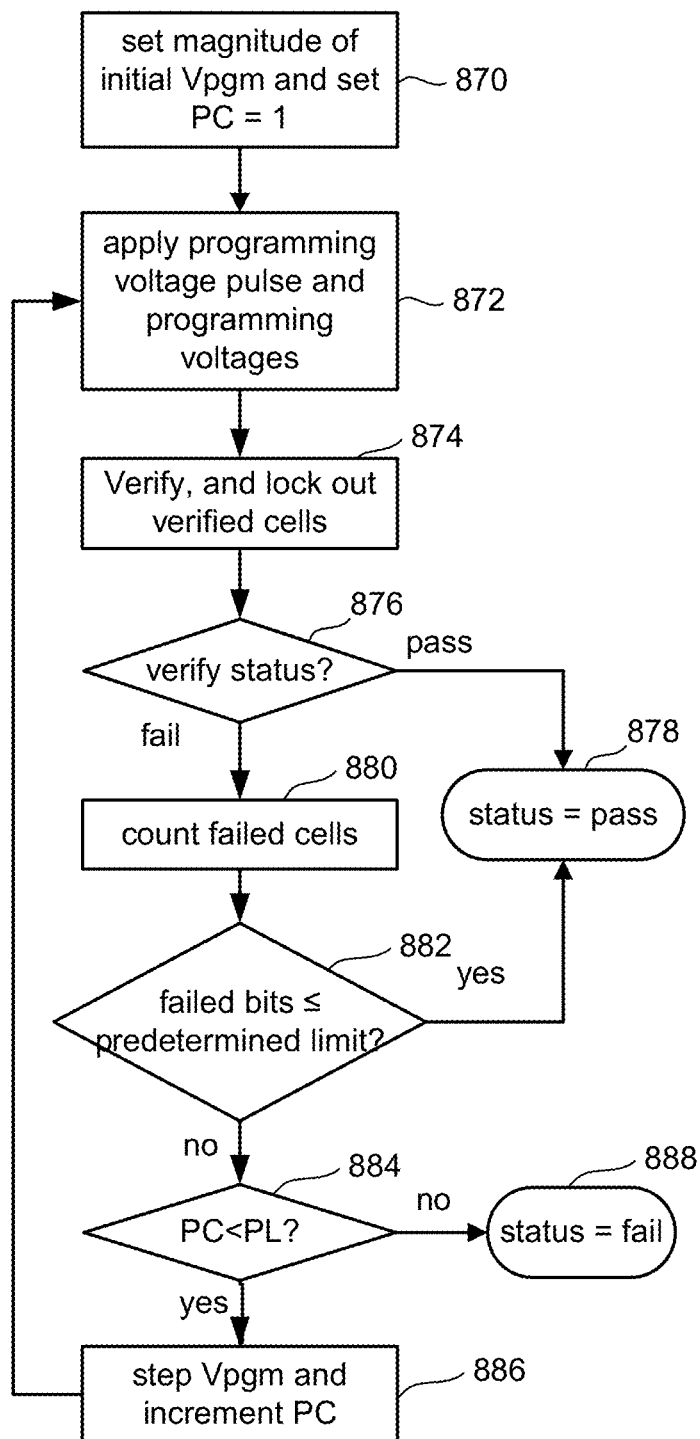
FIG. 8 is a flow chart describing one embodiment of a process for programming non-volatile memory.

FIG. 8 is a flowchart describing one embodiment of a process for programming that is performed by memory die 300/307. In one example embodiment, the process of FIG. 8 is performed on memory die 300/307 using the control circuit discussed above, at the direction of state machine 362. The process of FIG. 8 is performed to implement the programming of FIG. 7A, the full sequence programming of FIG. 7B, or other programming schemes including multi-stage programming. When implementing multi-stage programming, the process of FIG. 8 is used to implement any/each stage of the multi-stage programming process.

Figure 9:
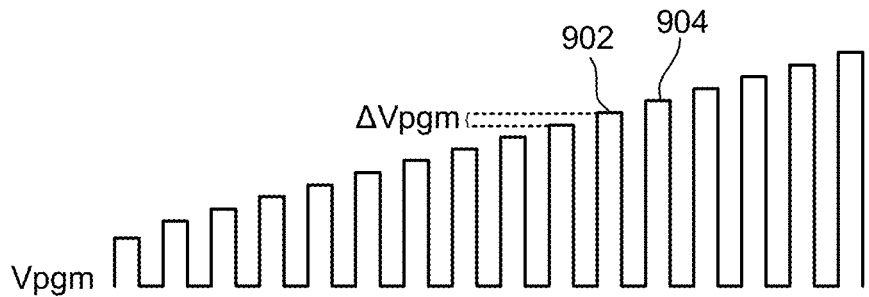
FIG. 9 depicts a series of programming voltage pulses.

Typically, a programming signal Vpgm is applied to the control gates (via a selected word line) during a program operation as a series of programming voltage pulses, as depicted in FIG. 9. Between programming pulses are a set of verify pulses to perform verification. In many implementations, the magnitude of the program pulses is increased with each successive pulse by a predetermined step size $\Delta$Vpgm (e.g., 0.2 v-0.5 v). In step 870 of FIG. 8, the programming voltage (Vpgm) is initialized to the starting magnitude (e.g., ~12-16 V or another suitable level) and a program counter PC maintained by state machine 362 is initialized at 1. In step 872, a program pulse of the programming signal Vpgm is applied to the selected word line (the word line selected for programming). In one embodiment, the group of memory cells being programmed concurrently are all connected to the same word line (the selected word line). The unselected word lines receive one or more boosting voltages (e.g., ~7-11 volts) to perform boosting schemes known in the art. In one embodiment, if a memory cell should be programmed, then the corresponding bit line is grounded. On the other hand, if the memory cell should remain at its current threshold voltage, then the corresponding bit line is connected to VDD (e.g., 1-3.5 volts) to inhibit programming. In step 872, the programming voltage pulse is concurrently applied to all memory cells connected to the selected word line so that all of the memory cells connected to the selected word line are programmed concurrently. That is, they are programmed at the same time or during overlapping times (both of which are considered concurrent). In this manner all of the memory cells connected to the selected word line will concurrently have their threshold voltage change, unless they have been locked out from programming.

In step 874, the appropriate memory cells are verified using the appropriate set of verify reference voltages to perform one or more verify operations. In one embodiment, the verification process is performed by testing whether the threshold voltages of the memory cells selected for programming have reached the appropriate verify reference voltage.

In step 876, it is determined whether all the memory cells have reached their target threshold voltages (pass). If so, the programming process is complete and successful because all selected memory cells were programmed and verified to their target states. A status of "PASS" (or success) is reported in step 878. If, in 876, it is determined that not all of the memory cells have reached their target threshold voltages (fail), then the programming process continues to step 880.

In step 880, the system counts the number of memory cells that have not yet reached their respective target threshold voltage distribution. That is, the system counts the number of memory cells that have, so far, failed the verify process. This counting can be done by the state machine 362, the controller 102, or other logic. In one implementation, each of the sense blocks will store the status (pass/fail) of their respective memory cells. In one embodiment, there is one total count, which reflects the total number of memory cells currently being programmed that have failed the last verify step. In another embodiment, separate counts are kept for each data state.

In step 882, it is determined whether the count from step 880 is less than or equal to a predetermined limit. In one embodiment, the predetermined limit is a number of bits that can be corrected by error correction codes (ECC) during a read process for the page of memory cells. If the number of failed cells is less than or equal to the predetermined limit, then the programming process can stop and a status of "PASS" is reported in step 878. In this situation, enough memory cells are programmed correctly such that the few remaining memory cells that have not been completely programmed can be corrected using ECC during the read process. In some embodiments, step 880 will count the number of failed cells for each sector, each target data state or other unit, and those counts will individually or collectively be compared to one or more thresholds in step 882.

In one embodiment, the predetermined limit can be less than the total number of bits that can be corrected by ECC during a read process to allow for future errors. When programming less than all of the memory cells for a page, or comparing a count for only one data state (or less than all states), than the predetermined limit can be a portion (pro-rata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria.

If the number of failed memory cells is not less than the predetermined limit, then the programming process continues at step 884 and the program counter PC is checked against the program limit value (PL). Examples of program limit values include 6, 20 and 30; however, other values can be used. If the program counter PC is not less than the program limit value PL, then the program process is considered to have failed, and a status of FAIL is reported in step 888. If the program counter PC is less than the program limit value PL, then the process continues at step 886 during which time the Program Counter PC is incremented by 1 and the program voltage Vpgm is stepped up to the next magnitude. For example, the next pulse will have a magnitude greater than the previous pulse by a step size (e.g., a step size of 0.1-0.4 volts). After step 886, the process loops back to step 872 and another program pulse is applied to the selected word line so that another iteration (steps 872-886) of the programming process of FIG. 8 is performed.

Because it is possible that errors can occur when programming or reading, and errors can occur while storing data (e.g., due to electrons drifting, data retention issues or other phenomenon), error correction is used with the programming of data. Memory systems often use Error Correction Codes (ECC) to protect data from corruption. Many ECC coding schemes are well known in the art. These conventional error correction codes are especially useful in large scale memories, including flash (and other non-volatile) memories, because of the substantial impact on manufacturing yield and device reliability that such coding schemes can provide, rendering devices that have a few non-programmable or defective cells as useable. Of course, a tradeoff exists between the yield savings and the cost of providing additional memory cells to store the code bits (i.e., the code "rate"). As such, some ECC codes are better suited for flash memory devices than others. Generally, ECC codes for flash memory devices tend to have higher code rates (i.e., a lower ratio of code bits to data bits) than the codes used in data communications applications (which may have code rates as low as $\frac{1}{2}$). Examples of well-known ECC codes commonly used in connection with flash memory storage include Reed-Solomon codes, other BCH codes, Hamming codes, and the like. Sometimes, the error correction codes used in connection with flash memory storage are "systematic," in that the data portion of the eventual code word is unchanged from the actual data being encoded, with the code or parity bits appended to the data bits to form the complete code word.

The particular parameters for a given error correction code include the type of code, the size of the block of actual data from which the code word is derived, and the overall length of the code word after encoding. For example, a typical BCH code applied to a sector of 512 bytes (4096 bits) of data can correct up to four error bits, if at least 60 ECC or parity bits are used. Reed-Solomon codes are a subset of BCH codes, and are also commonly used for error correction. For example, a typical Reed-Solomon code can correct up to four errors in a 512 byte sector of data, using about 72 ECC bits. In the flash memory context, error correction coding provides substantial improvement in manufacturing yield, as well as in the reliability of the flash memory over time.

In some embodiments, controller 102 receives host data (also referred to as user data or data from an entity external to the memory system), also referred to as information bits, that is to be stored non-volatile memory structure 302. The informational bits are represented by the matrix i=[1 0] (note that two bits are used for example purposes only, and many embodiments have code words longer than two bits). An error correction coding process (such as any of the processes mentioned above or below) is implemented by ECC engine 226/256 of controller 102 in which parity bits are added to the informational bits to provide data represented by the matrix or code word v=[1 0 1 0], indicating that two parity bits have been appended to the data bits. Other techniques can be used that map input data to output data in more complex manners. For example, low density parity check (LDPC) codes, also referred to as Gallager codes, can be used. More details about LDPC codes can be found in R. G. Gallager, "Low-density parity-check codes," IRE Trans. Inform. Theory, vol. IT-8, pp. 21 28, January 1962; and D. MacKay, Information Theory, Inference and Learning Algorithms, Cambridge University Press 2003, chapter 47. In practice, such LDPC codes are typically applied (e.g., by ECC engine 226/256) to multiple pages encoded across a number of storage elements, but they do not need to be applied across multiple pages. The data bits can be mapped to a logical page and stored in memory structure 302 by programming one or more memory cells to one or more programming states, which corresponds to v.

In one embodiment, programming serves to raise the threshold voltage of the memory cells to one of the programmed data states S1-S7. Erasing serves to lower the threshold voltage of the memory cells to the Erase data state S0.

One technique to erase memory cells in some memory devices is to bias a p-well (or other types of) substrate to a high voltage to charge up a NAND channel. An erase enable voltage is applied to control gates of memory cells while the NAND channel is at a high voltage to erase the non-volatile storage elements (memory cells). Another approach to erasing memory cells is to generate gate induced drain leakage (GIDL) current to charge up the NAND string channel. An erase enable voltage is applied to control gates of the memory cells, while maintaining the string channel potential to erase the memory cells.

In one embodiment, the GIDL current is generated by causing a drain-to-gate voltage at a select transistor. A transistor drain-to-gate voltage that generates a GIDL current is referred to herein as a GIDL voltage. The GIDL current may result when the select transistor drain voltage is significantly higher than the select transistor control gate voltage. GIDL current is a result of carrier generation, i.e., electron-hole pair generation due to band-to-band tunneling and/or trap-assisted generation. In one embodiment, GIDL current may result in one type of carriers, e.g., holes, predominantly moving into NAND channel, thereby raising potential of the channel. The other type of carriers, e.g., electrons, are extracted from the channel, in the direction of a bit line or in the direction of a source line, by an electric field. During erase, the holes may tunnel from the channel to a charge storage region of memory cells and recombine with electrons there, to lower the threshold voltage of the memory cells.

The GIDL current may be generated at either end of the NAND string. A first GIDL voltage may be created between two terminals of a select transistor (e.g., drain side select transistor) that is connected to a bit line to generate a first GIDL current. A second GIDL voltage may be created between two terminals of a select transistor (e.g., source side select transistor) that is connected to a source line to generate a second GIDL current. Erasing based on GIDL current at only one end of the NAND string is referred to as a one-sided GIDL erase. Erasing based on GIDL current at both ends of the NAND string is referred to as a two-sided GIDL erase.

Figure 10:
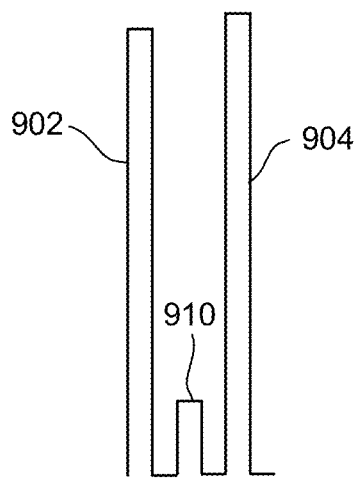
FIG. 10 depicts two programming voltage pulses and a verify voltage pulse.
Figure 11:
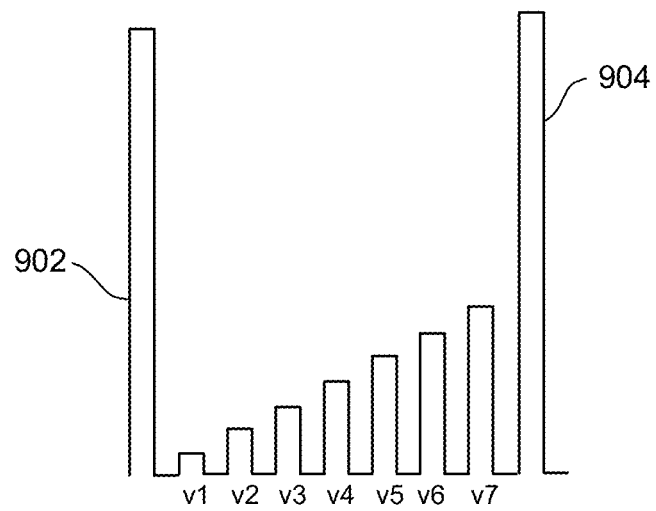
FIG. 11 depicts two programming voltage pulses and a set of verify voltage pulses.

As discussed above, FIG. 9 depicts the programming signal Vpgm as a series of programming voltage pulses. These programming voltage pulses are one example of doses of programming applied to a plurality of non-volatile memory cells being programmed to a data state. As described by FIG. 8, the system performs program verification between the doses of programming, as depicted in FIGS. 10 and 11. FIG. 10, which illustrates an embodiment in which memory cells store one bit of data per memory cell, depicts two of the programming voltage pulses 902 and 904 of FIG. 9. Between programming voltage pulses 902 and 904 is verify voltage pulse 910. In one embodiment, verify voltage pulse 910 has a magnitude of Vv (see FIG. 7A) and represents the system performing program verification (step 874) between the doses of programming (successive iterations of step 872).

FIG. 11, which illustrates an embodiment in which memory cells store three bits of data per memory cell, depicts two of the programming voltage pulses 902 and 904 of FIG. 9. Between programming voltage pulses 902 and 904 are verify voltage pulses v1, v2, v3, v4, v5, v6 and v7. In one embodiment, verify voltage pulse v1 has a magnitude of Vv1 (see FIG. 7B), verify voltage pulse v2 has a magnitude of Vv2, verify voltage pulse v3 has a magnitude of Vv3, verify voltage pulse v4 has a magnitude of Vv4, verify voltage pulse v5 has a magnitude of Vv5, verify voltage pulse v6 has a magnitude of Vv6, and verify voltage pulse v7 has a magnitude of Vv7. Verify voltage pulses v1, v2, v3, v4, v5, v6 and v7 represent the system performing program verification (step 874) between the doses of programming (successive iterations of step 872).

Figure 12:
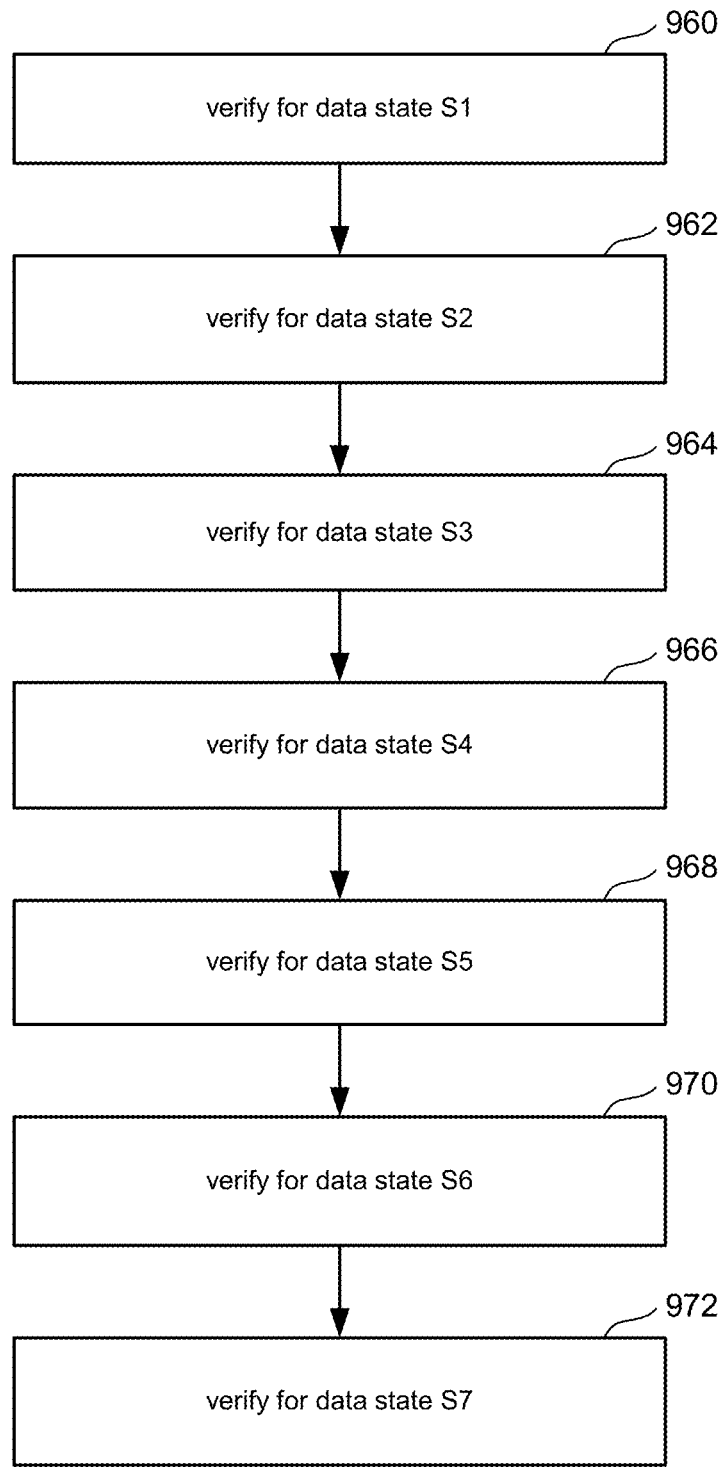
FIG. 12 is a flow chart describing one embodiment of a process for verifying programming of non-volatile memory.

FIG. 12 is a flow chart describing one embodiment of a process for verifying programming of non-volatile memory. That is, the process of FIG. 12 is a process performed during an example implementation of step 874 of FIG. 8 for an embodiment in which memory cells store three bits of data per memory cell. The process of FIG. 12 is performed using the waveforms of FIGS. 9 and 11. In step 960 of FIG. 12, the system performs verification for data state S1. For example, the system tests whether memory cells being programmed to data state S1 have threshold voltages greater than Vv1 (e.g., applying verify voltage pulse v1 of FIG. 11 to the control gates of memory cells being programmed to data state S1).

In step 962, the system performs verification for data state S2. For example, the system tests whether memory cells being programmed to data state S2 have threshold voltages greater than Vv2 (e.g., applying verify voltage pulse v2 of FIG. 11 to the control gates of memory cells being programmed to data state S2).

In step 964, the system performs verification for data state S3. For example, the system tests whether memory cells being programmed to data state S3 have threshold voltages greater than Vv3 (e.g., applying verify voltage pulse v3 of FIG. 11 to the control gates of memory cells being programmed to data state S3).

In step 966, the system performs verification for data state S4. For example, the system tests whether memory cells being programmed to data state S4 have threshold voltages greater than Vv4 (e.g., applying verify voltage pulses v4 of FIG. 11 to the control gates of memory cells being programmed to data state S4).

In step 968, the system performs verification for data state S5. For example, the system tests whether memory cells being programmed to data state S5 have threshold voltages greater than Vv5 (e.g., applying verify voltage pulses v5 of FIG. 11 to the control gates of memory cells being programmed to data state S5).

In step 970, the system performs verification for data state S6. For example, the system tests whether memory cells being programmed to data state S6 have threshold voltages greater than Vv6 (e.g., applying verify voltage pulse v6 of FIG. 11 to the control gates of memory cells being programmed to data state S6).

In step 972, the system performs verification for data state S7. For example, the system tests whether memory cells being programmed to data state S7 have threshold voltages greater than Vv7 (e.g., applying verify voltage pulse v7 of FIG. 11 to the control gates of memory cells being programmed to data state S7). Note that, in one embodiment, steps 960-972 are performed between doses of programming (e.g., between programming voltage pulses). In some embodiments, one or more of steps 960-972 can be skipped between certain programming voltage pulses. In one embodiment, steps 960-972 are performed sequentially (in any order or in the order depicted), while in other embodiments steps 960-972 are performed in parallel (e.g., concurrently).

The flow of FIG. 12 illustrates the verification of all of the target data states, but to speed up the verification phase of a programming operation a "smart verify" operation can be used. In a smart verify, not all of the target data state levels are checked. Initially, for the first few programming pulses, only the lower data states need to be checked. As the programming operation continues, as the lower target data states begin to verify, additional higher data states are included; and, as the lower states finish, the lower target state verifies can be dropped out.

In the examples of FIGS. 7A and 7B, programming may be performed in a single continuous operation starting with all memory cells in the erased distribution (E or S0) and ending with all or substantially all memory cells verified as being in their target distributions according to data to be stored. In other examples, programming to the states illustrated in FIGS. 7A and 7B may occur in two or more separate programming operations that may be performed at different times. Other operations may be performed between such programming operations.

In some cases, programming of one or more memory cells may affect threshold voltage distributions of previously programmed memory cells. For example, programmed memory cells along a word line of a NAND structure may be affected by programming of subsequent word lines of the NAND structure (e.g., programming of memory cells along an adjacent word line in the same block). When charge is added to nearby memory cells, the threshold voltages of previously programmed memory cells may increase so that threshold voltage distributions change in what may be referred to as "program disturb." This may cause misreading of data. In order to reduce such program disturb effects, programming may be performed in two or more operations to allow programming of adjacent memory cells before programming is finalized. For example, a first programming operation may program a group of memory cells to first distributions that are close to the final distributions in what may be referred to as a foggy programming operation. Then, memory cells of one or more neighboring word line may be programmed. Subsequently, after the neighboring cells are programmed, another program operation (fine programming operation) may program the group of memory cells to second distributions (e.g., final distributions like those shown in FIGS. 7A and 7B). Programming to first (approximate or foggy) distributions and subsequently programming to second (accurate or fine) distributions in this way may be referred to as foggy-fine programming.

Figure 13:
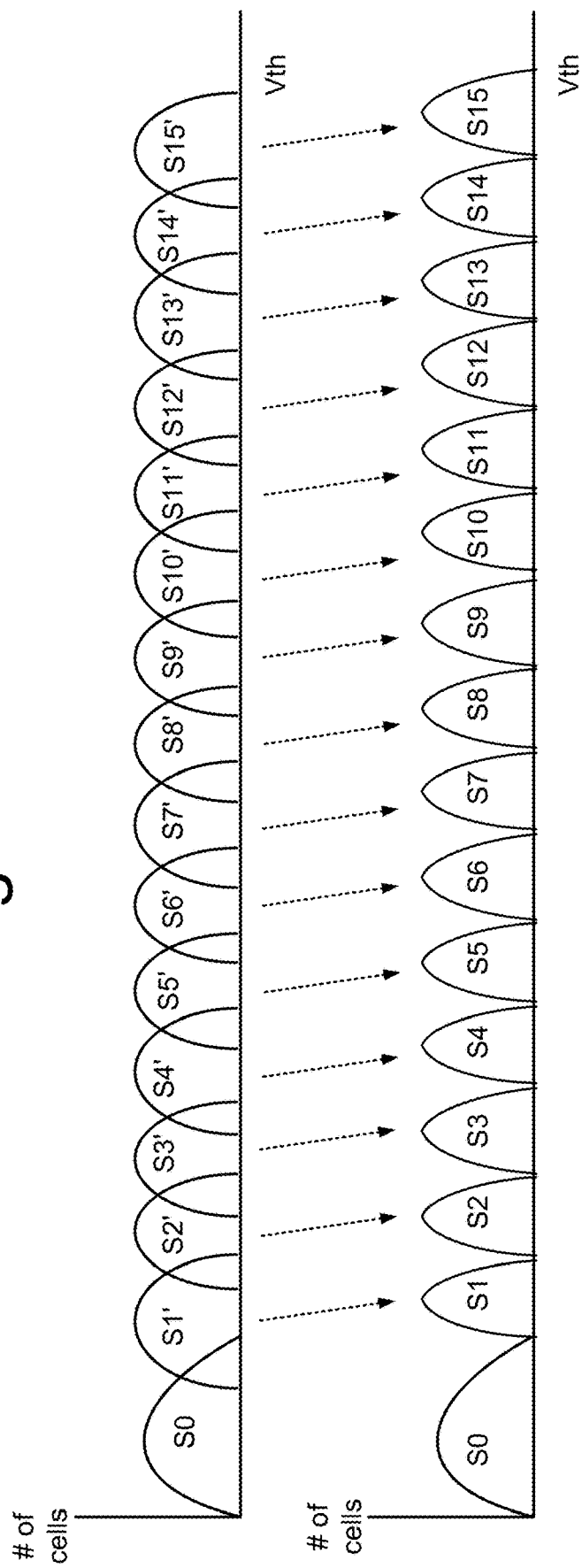
FIG. 13 illustrates an example of foggy programming followed by fine programming.

FIG. 13 illustrates an example of foggy-fine programming of a group of QLC memory cells using sixteen distributions corresponding to sixteen data states. All memory cells may be in an erased distribution (e.g., distribution S0) prior to foggy programming. Foggy programming programs memory cells to the first distributions S1' to S15' shown on the top of FIG. 10. Fine programming subsequently programs the memory cells to the second distributions S1 to S15 shown on the bottom. There may be some time between these two program operations and one or more other groups of memory cells may be programmed during that time. It will be understood that memory cells of a given first distribution are subsequently further programmed to a corresponding second distribution without erasing memory cells between so that fine programming does not start from the erased distribution. For example, memory cells that are programmed to the S1' distribution in a foggy program operation are subsequently further programmed to the S1 distribution in a fine program operation, memory cells that are programmed to the S2' distribution in a foggy program operation are subsequently further programmed to the S2 distribution in a fine program operation, memory cells that are programmed to the S3' distribution in a foggy program operation are subsequently further programmed to the S3 distribution in a fine program operation, and so on. First distributions S1' to S15' are generally wider than second distributions S1-S15 and there is significant overlap between adjacent distributions (e.g., distribution S1' overlaps distribution S2', distribution S2' overlaps distribution S3' and so on). Programming to first distributions may use the same programming steps as used for second distributions or may use different steps (e.g., programming pulses of the same voltage and time or different voltage and/or time). Reading memory cells that are in the first distributions S1' to S15' using read voltages similar to those shown in FIG. 7B, but for 16 states, may provide a large number of errors (e.g., more errors that can be corrected by ECC) because of such overlaps so that another source may be used for fine programming. A safe copy of the data may be maintained in another location between foggy program and fine program operations so that a good copy is available for fine programming. For example, a copy of the data may be written in additional non-volatile memory cells (e.g., in SLC memory cells, which may be in the same memory structure as the MLC memory cells, or elsewhere) or in a volatile memory for subsequent fine programming.

When using a foggy-fine programming algorithm, a number of embodiments can be used for the order in which the word lines are programed to the foggy and fine states in order to help reduce program disturb due to having a word line being programmed to the fine state while next to an erased word line. For example, after writing word line N to the foggy state, word line (N+1) is then programmed to the foggy state, after which word line N is programmed to its fine state. Once word line N is fine programmed, word line (N+2) is foggy programmed, before returning to program word line (N+1) to the fine state, and so on sequentially across the block until all word lines are written.

Figure 14:
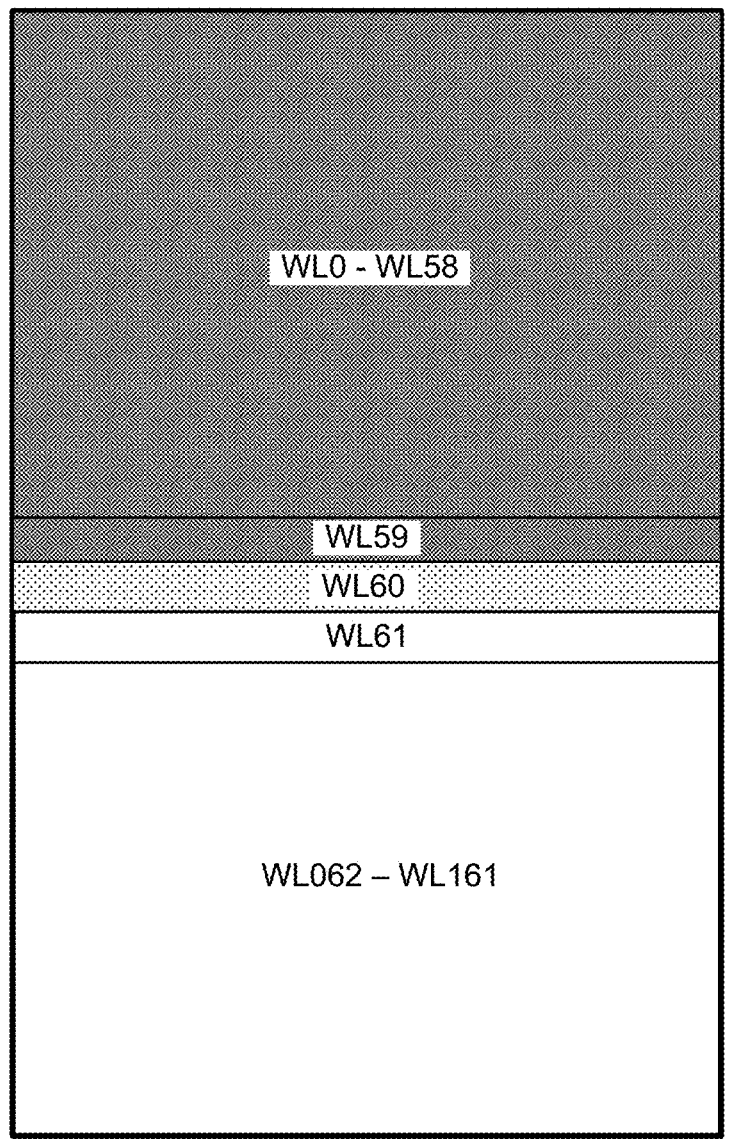
FIG. 14 is a schematic representation of a partially written, open block of NAND memory.

In a block based memory system, such as the NAND memory structures described above, when all the word lines of the block have been programmed it can be called a "Closed Block" (CB), as it is not available for data to be written. If less than all of a block's word lines are not programmed, it is called an "Open Block" (OB) that is available for having data written thereto. Continuing with the NAND memory examples presented above, NAND memory is typically written starting one end with word line WL0 and working progressively towards word line WL(n−1). As data is written to a block, the logical word lines of a block are assigned WL0 to WL(n−1), where in a normal program order are written starting from the source end of a NAND string and working toward the bit line, or drain, end. In a reverse program order, the block is written in the opposite direction. (In some cases, such as when the memory structure has a "vertical" sub-block structure, both of the orders may be used depending on the circumstances and sub-block.) FIG. 14 illustrates an example of a partially written, or open, block when a foggy-fine programing algorithm is used.

FIG. 14 is a schematic representation of a partially written, open block of NAND memory. This example is for an open block of NAND memory with 162 data word lines using a foggy-fine programming algorithm, where word lines 0-59 have been fully programmed (both foggy and fine write phases, as represented by the heavy stippling), word line 60 has been foggy programmed (but not fine, as represented by the light stippling), and word lines 61-161 are still in the erased state (no stippling). In this situation, the programmed word line adjacent to an erased word line sees a different environment than the other word lines, such as this example where WL60 is foggy programmed while WL59 is still erased.

Figure 15A:
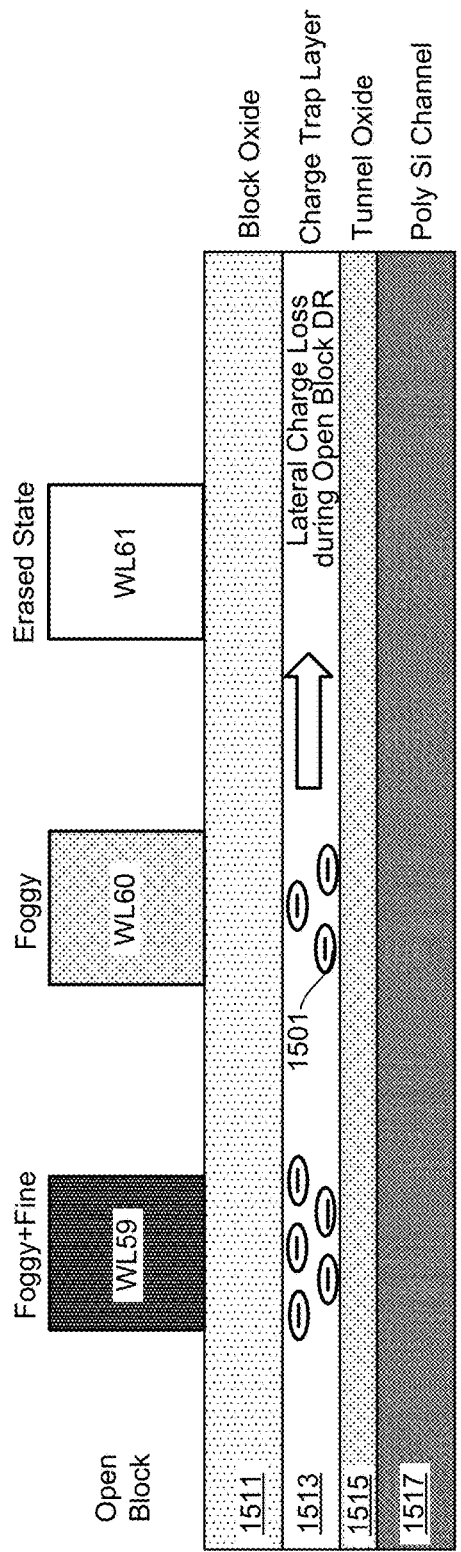
FIGS. 15A and 15B looks at a region of a NAND string under several word lines when one of these word lines is at the programming boundary of an open block and when the block is closed.
Figure 15B:
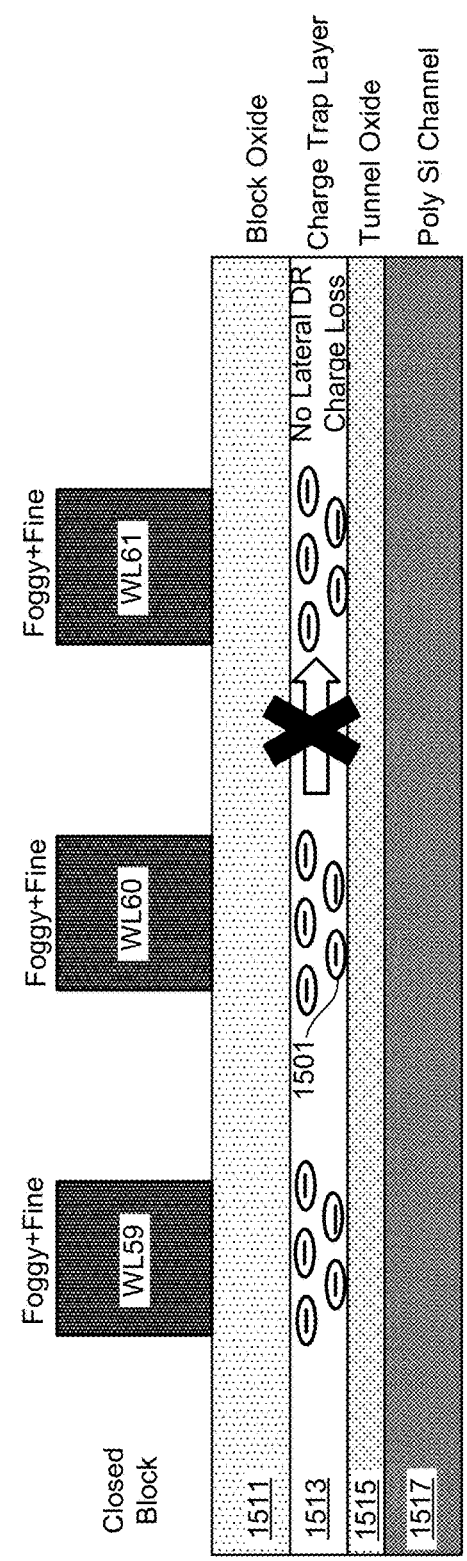

FIGS. 15A and 15B looks at a region of a NAND string under several word lines when one of these word lines is at the programming boundary of an open block and when the block is closed, respectively. These figures again consider word lines WL59, WL60, and WL61, where these are above the polysilicon channels 1517, with a charge trapping layer 1513 separated from the channel 1517 by a tunnel oxide 1515 and separated from the word lines by the blocking oxide 1511. This is a simplified version of a portion of the structure illustrated above with respect to FIGS. 5-6E. FIGS. 15A and 15B show a portion of only one NAND string of the block, but this is representative of the block's other NAND strings. In FIG. 15A, the block is open and corresponds to the state illustrated in FIG. 14, with word lines WL0-WL59 foggy and fine programmed, WL60 foggy programmed, and WL61-WL161 yet to be written. In the charge trapping layer 1513 electrons, such as that indicated at 1501, have been trapped as part of the program operation below fully written word lines WL0-WL59, with a lower number of electrons trapped for the foggy programmed WL60, no electrons stored under erased WL61-WL161. In some embodiments, the erased word lines may have holes in the charge trapping layer 1513. In the case of a closed block, as in FIG. 15B, all of the word lines have been fully written (both foggy and fine) and will (for all non-S0 states) have some number of electrons trapped.

In FIGS. 14 and 15A, word line WL60 is an "edge" word line, in that it is programmed and adjacent to an erase word line. Because of this, WL60 sees a different environment when compared to other word lines of the block. During a data read of a NAND string, unselected word lines are biased at a read bypass voltage, Vread. This can result to data retention problems as these bias conditions can result in lateral charge loss on the edge word line of an open block during a data read (DR), causing electrons to migrate along the charge trapping layer toward the adjacent erased word line as represented by the arrow. These edge word line read disturbs can increase the failed bit count of the block.

In this foggy-fine example, the edge word line is at the intermediate foggy state, but this situation will also apply when word line are written directly to the final state or when there is more than one intermediate foggy programming. In any of these cases, the edge word line will see this effect, lowering WL60's threshold voltage and also somewhat raising that of WL61. WL59 also sees a different environment, but the effect is less pronounced as WL60 will have been programmed to fairly close to its final state.

FIG. 15B looks at the situation of the same section of the NAND string once the block is closed. All of the word lines have been fully written to their target state, having undergone both foggy and fine program phases. In this situation, both of WL60 and WL61 are fully written, as represented by the electrons 1501 under each of the word lines. During a data read, the applied voltages will generally no longer result in the voltage differential along the charge trap layer 1513 and there will be no (or no additional) lateral data read charge loss, as represented by the X.

To help to account for this edge word line effect, the memory system can maintain a time tag (a time stamp value) to keep track of how long a word line of an open block has been an edge word line, where in some embodiments this can alternately or additionally be based on the number of data read performed on the block. The edge word line, here WL60, is the time tag acquisition word line in some embodiments. In other embodiments, this can be based on a group of word lines, such in embodiments where the word lines are treated on a zone basis, where a block is split up into a number of zones, such as 5-10 zones, of contiguous sets of word lines. The zone structure can be used determine word line read level shifts in some embodiments, where, for example, during a data read a lower Vread level can be applied to unwritten zones (i.e., where all of the word lines are still in an erased state) of an open block than the Vread used for already programmed zones. For example, the system can keep a look-up-table of read shift levels applied to word lines of zones based on time tag value of the edge word line of a zone. In one set of embodiments, the time tag word line zone table can be optimized for the closed block where all word lines see the same reliability condition. In the open block example of FIGS. 14 and 15A, as the characteristics of WL60 is different from all of the block's other word lines, this can cause inappropriate shifts to the other word lines apart from WL60, where the inappropriate read level causes the spikes in failed bit count of the block beyond those directly due the reading of the disturbed edge word line itself.

In one approach to time tags, the word line or set of word lines used for time tag acquisition is static, in that one word line (or, in some cases, one word line per zone) is always used as the time tag word line. For example, this could be WL60, with this word line used as the time tag word line whenever a time tag word line zone read is used. In the case of an open block under this arrangement, word lines that are programmed before an open block data read go through an extra data read, which increases the failed bit count of these word lines. This increase is error is usually manageable for when the edge word line (i.e., last written) is not a time tag acquisition word line. However, when the edge word line of an open block is the time tag word line, such as WL60 in the examples here where WL0-WL59 are foggy+fine programmed, WL60 foggy programmed, and WL61-WL161 are erased, the mechanism illustrated with respect to FIG. 15A will not only result in failed bits for the edge word line itself, but will also cause the word line zone table values based on the edge time tag word line is inefficient, as can be illustrated with respect to FIGS. 16 and 17.

Figure 16:
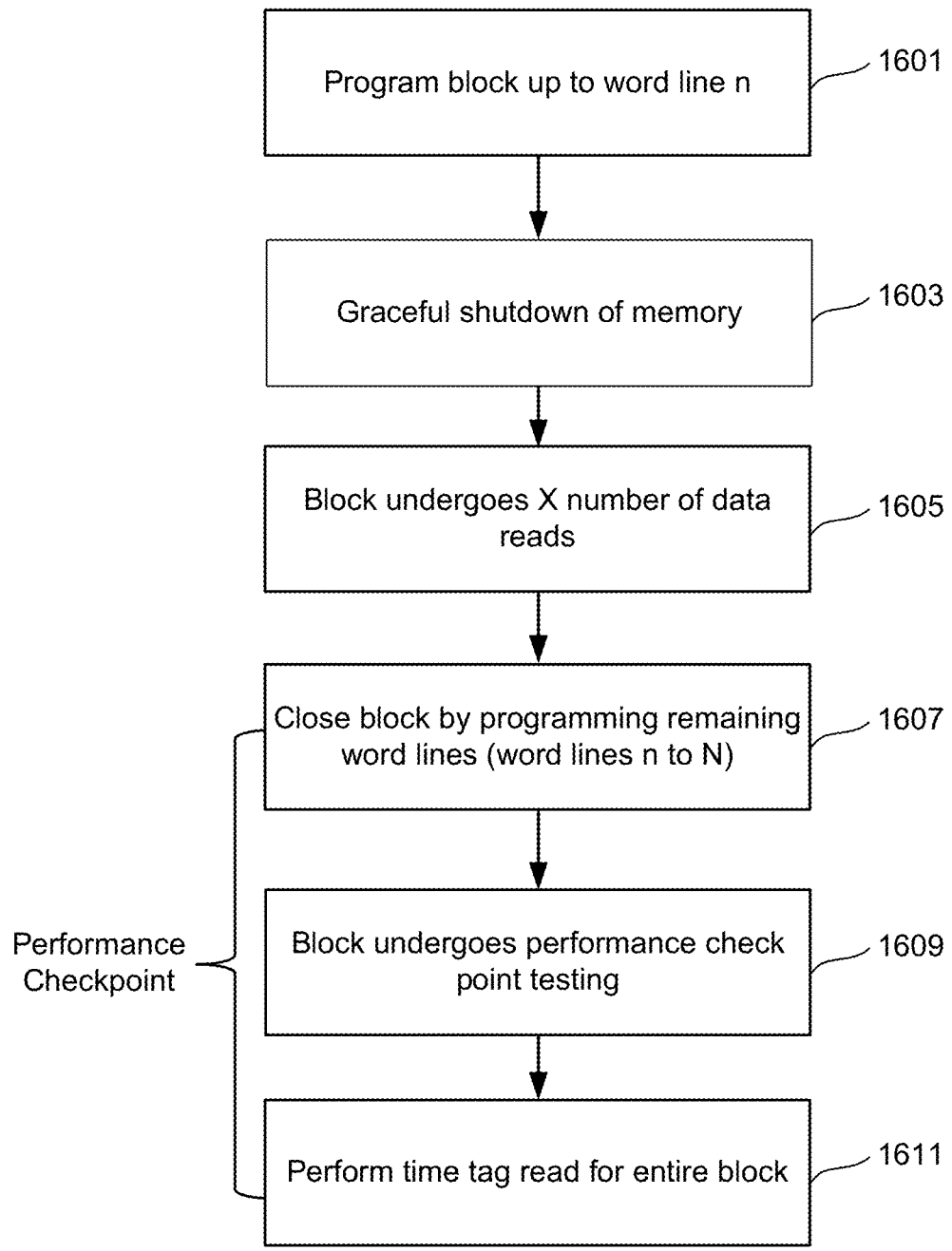
FIG. 16 is a flowchart for operation of a memory block with a static time tag word line assignment.

FIG. 16 is a flowchart for operation of a memory block with a static time tag word line assignment. Beginning at step 1601, an erased memory block is programmed to word line n, so that WL0-WL(n−1) are fully written, WLn is the edge word line, and WL(n+1)-WL(N−1), where there are N word lines in the block. For a time tag acquisition word line, the time tag is recorded as part of the write of WL60. For the example above in FIGS. 14-15B, N=162 and the edge word line is WL60. Some time later, at step 1603, the memory undergoes a graceful, or planned, shutdown, as opposed to an ungraceful shut down such as a power loss where parameters and other operating values may not have been saved or the memory is in the middle of an operation. At step 1603, the last written (edge) word line number can be saved, along with time tags and other parameter values saved. While in this open state, the block then undergoes some number X of data reads at step 1605, during which the edge word line undergoes the stress illustrated in FIG. 15A for WL60.

At step 1607 the memory block is closed by programming the remaining unprogrammed word lines, such as by performing fine phase programming on WLn and foggy and fine programming phases on WL(n+1)-WL(N−1). Once the block is closed, the situation will be as in FIG. 15B and WL60 will not see the same stress, but the disturbs on WL60 due to the data reads at 1605 will still have degraded the data stored on the edge word line. Steps 1607, 1609, and 1611 can be used as a performance check point. In step 1609 the block, or the whole of the memory device, can undergo performance check point testing, such as from a set of specifications for performance checkpoints; for example, it can be placed at relatively high temperature (e.g., 75C or other temperature in some range, such as 70C-85C) for a test period (e.g., a few hours, such 2 hours). A time tag read can then be performed for the entire block at step 1611, where this can be one or more predetermined time tag acquisition word lines used for time tag acquisition purposes. As noted above, this can be one or multiple time tag acquisition word lines, depending on the embodiment. In embodiments with zone managed blocks, each zone can have a corresponding time tag acquisition word line.

Figure 17:
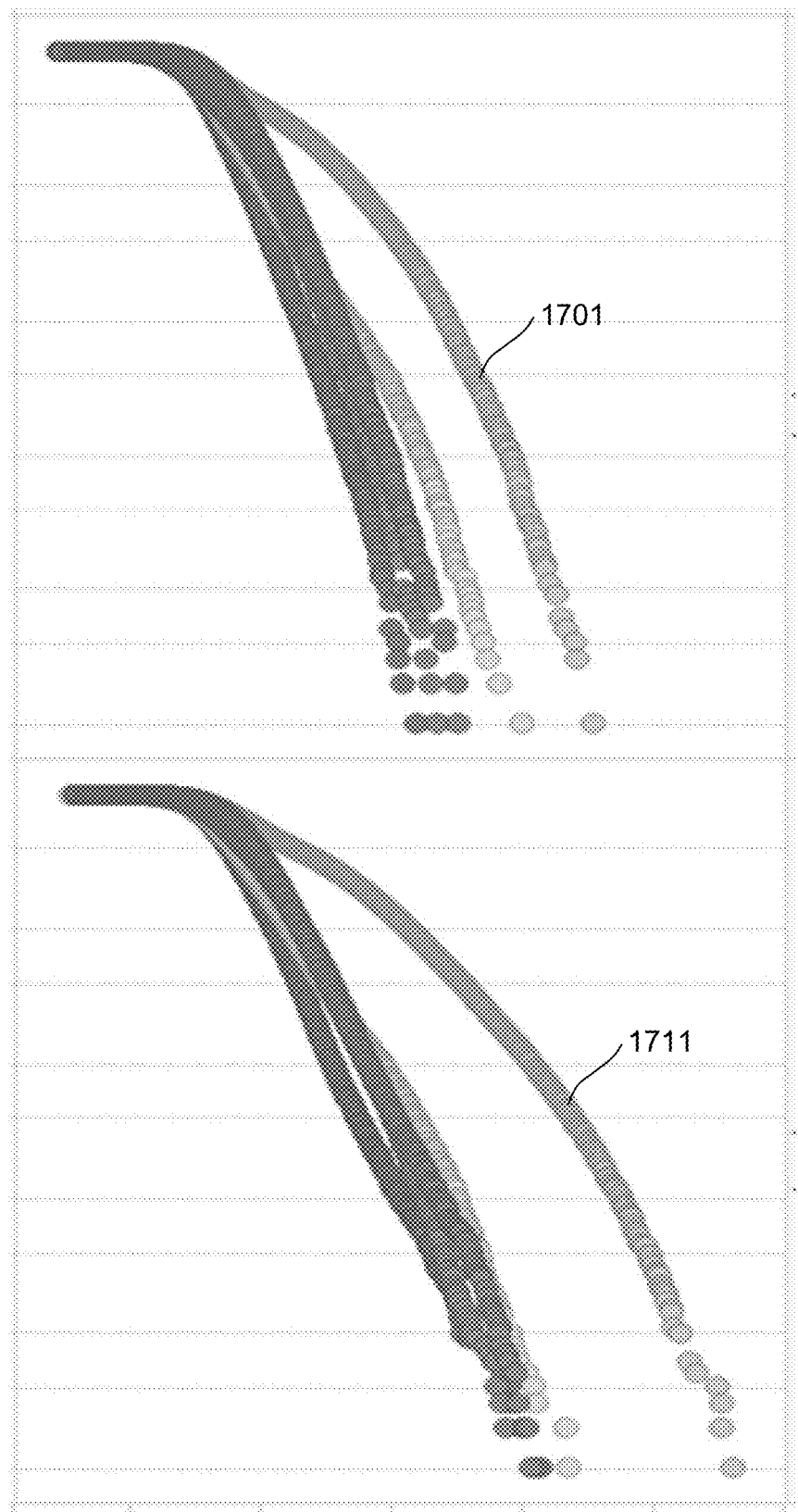
FIG. 17 presents measured data on time tag reads for a page of written data after performance checkpoint for blocks at the beginning of life and at middle of life to illustrate the effect being an edge word line on a time tag acquisition word line.

FIG. 17 presents measured data on time tag reads for a page of written data after performance checkpoint for blocks at the beginning of life and at middle of life to illustrate the effect being an edge word line on a time tag acquisition word line. In FIG. 17, the upper portion corresponds to a device at its beginning of life, after, for example, several dozens of program erase cycles and the lower portion corresponds to a device at its middle of life, after, for example, several hundreds of program erase cycles. Each of the sets of circles correspond to the case of a different word line being the boundary word line of an open block that has undergone multiple reads, represented as increasing downward on the vertical axis. The horizontal axis of each is the failed bit count. Each set of points for each figure is for a specific word line and illustrate the effect of its data reads on the failed bit count of block. Of these, WL60 is an edge word line and is labelled 1701 for the beginning of life data values and labelled 1711 for the end of life data values. The upper, beginning of life data values 1701 show the increased failed bit count of a block due to the time tag acquisition word line. This effect becomes even more pronounced as the device ages, such as shown by the middle of life values 1711. As shown, when a time tag acquisition word line is an edge word line for any significant period, the failed bit count rate will spike, particularly as the device ages. Altered read conditions can be used to read the time tag word line, but such read conditions tend to degrade performance. Consequently, the spike in the failed bit count when the time tag acquisition word line is an edge word line can limit the capability of the memory device.

Figure 18:
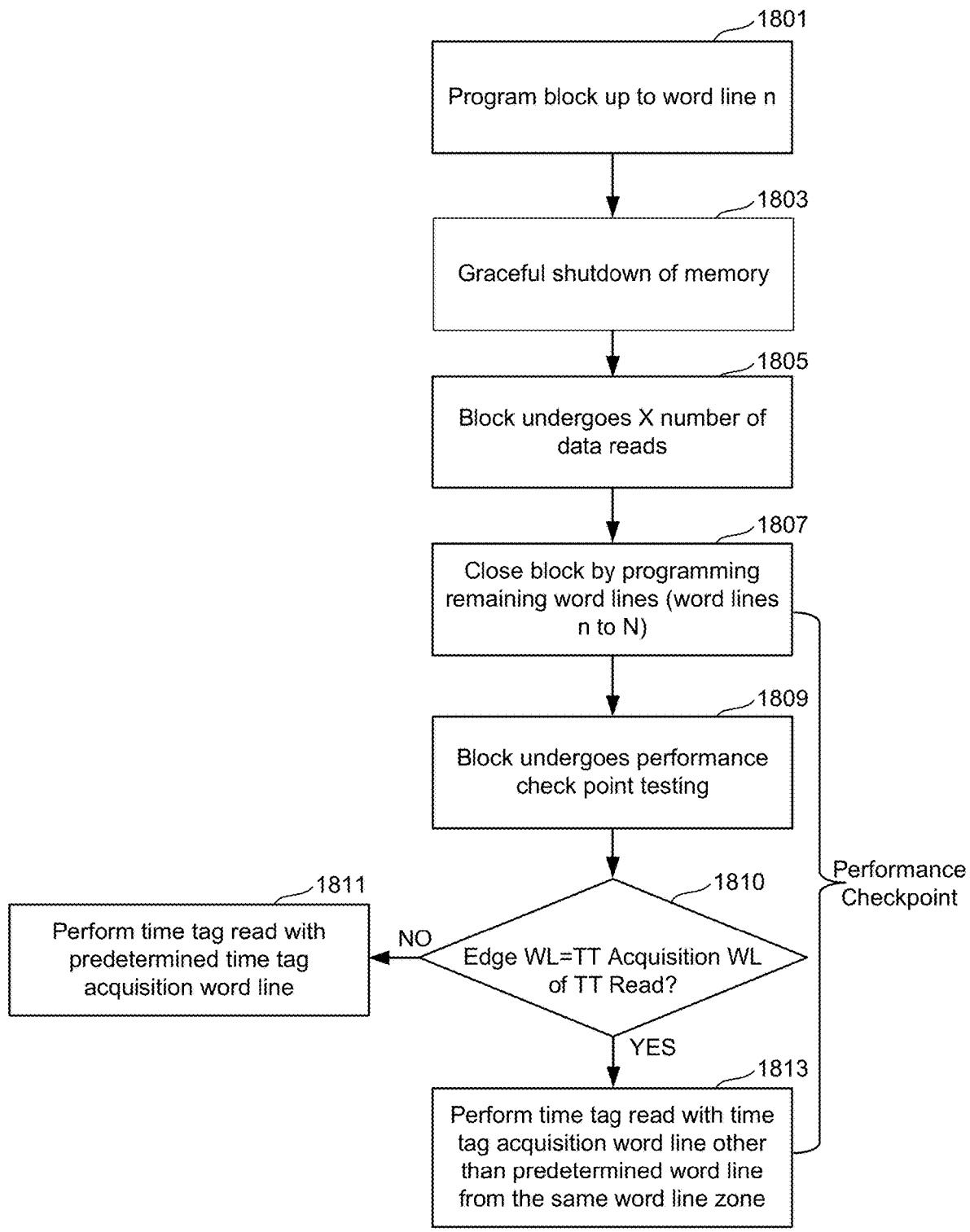
FIG. 18 is a flowchart of an embodiment for operation of a memory block with a time tag word line shift approach for when the predetermined time tag word line is an edge word line.

FIG. 18 is a flowchart of an embodiment for operation of a memory block with a time tag word line shift approach for when the predetermined time tag word line is an edge word line. The first part of the flow of FIG. 18 can be as described above for FIG. 16, where steps 1801, 1803, 1805, 1807, and 1809 can respectively correspond to steps 1601, 1603, 1605, 1607, and 1609. In particular, as part of the graceful shut down at step 1803, the number of the last written, edge word line can be saved. As discussed above, in the case of an open block when the edge word line is a time tag acquisition word line, time tag word line zone table becomes inefficient due to change in the time tag acquisition word line data read environment being different compared to other word lines. To address this problem, the flow of FIG. 18 introduces a time tag word line shift approach to change the time tag acquisition word line in this situation.

Step 1810 determines whether the edge word line of an open block is a time tag acquisition word line used for time tag reads of the block or zone of the block. The memory system will have one or more default predetermined time tag acquisition word lines, where, depending on the embodiment, this could be one such word line or several such word lines. In a zone based embodiment, where the word lines of a block is subdivided into multiple zones of contiguous groups of word lines, there could be one time tag acquisition word line for each zone. For example, for the word line WL60 example used above, this could be the time tag acquisition word line of a zone of word lines WL54-WL73 or other range including WL60. The control circuitry, such as on memory die 300 or control die 311 and/or memory controller 102, will know which word line or lines of a block are the predetermined assigned time tag word lines. These can be determined as part of the device characterization process and will typically be near the middle of zone. The more time tag word lines per block, the higher the likelihood at some point a time tag acquisition word line will an edge word line for an open block. The control circuit typically also knows the edge word line of an open block so that it know where to resume programming, where this word line number can be saved at step 1803, although this information can be obtained by scanning the block. In step 1810, the control circuitry compares the edge word line value to the time tag acquisition word line or lines values. As noted previously, although the discussion here is mainly in the context of a foggy-fine programming algorithm where the edge word line has only undergone foggy programming, but in other cases the edge word line may be fully programmed to its final target data states.

If the edge word line is not a predetermined time tag acquisition word line, the time tag read can be performed using the predetermined time tag acquisition word line in step 1811, corresponding to step 1611 of FIG. 16. If instead the edge word line is a time tag acquisition word line used for the time tag reads, the flow continues on the step 1813. In step 1813, the time tag read is performed using a time tag acquisition word line other than the predetermined one. In a zone based embodiment, this alternate time tag acquisition word line can be taken from the same zone, where this can be selected from near the middle of the zone so that it is more representative of the zone. In other embodiment, the replacement time tag acquisition word line can be selected from a zone other than the existing zone, however this approach can result in increased look up table size for the time tag word line zone table. The time tag acquisition word line selection can be perform at the back end of a read operation so that extra time is needed to do the actual data read operation.

Figure 19:
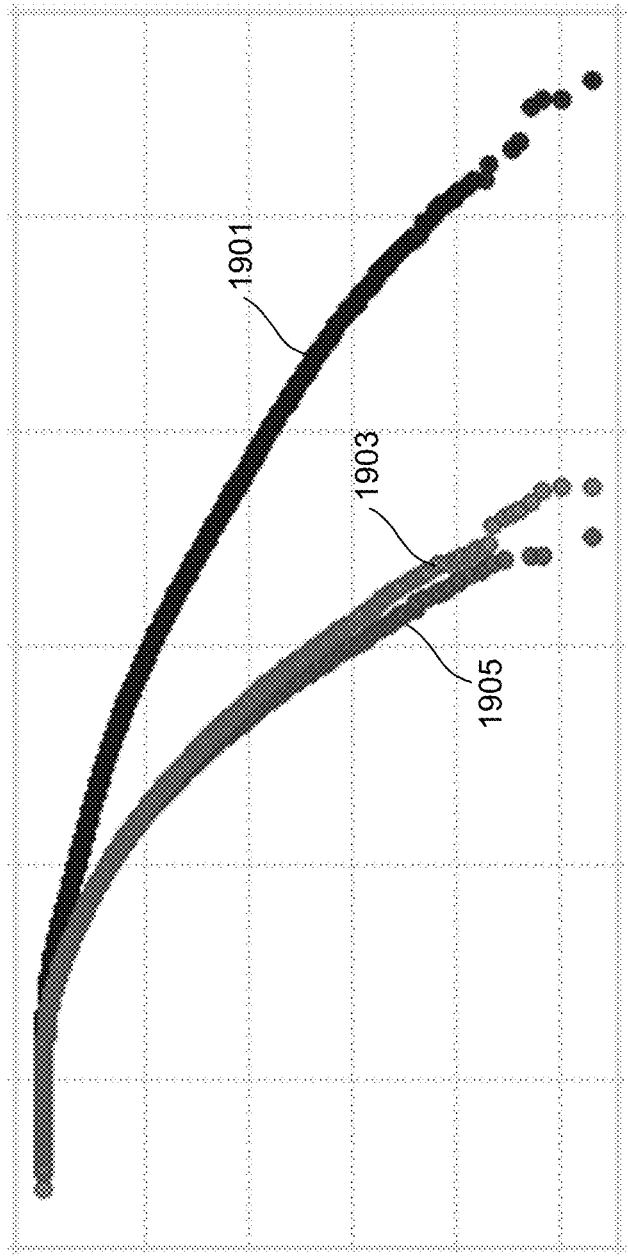
FIG. 19 illustrates the effect of time tag word line shift of FIG. 18 on the failed bit count.

FIG. 19 illustrates the effect of time tag word line shift of FIG. 18 on the failed bit count. The plot of FIG. 19 is laid out as in FIG. 17 with failed bit count on the horizontal axis. FIG. 19 is for a page of data when the edge bit line is the predetermined default time tag acquisition word line. All three sets of point are for the same read process and when the shifted time tag acquisition word line is in the same word line zone as the predetermined case. In this example, the predetermine time tag acquisition word line and edge word line is again the WL60 example, whose failed bit count is indicated at 1901. The points of 1903 and 1905 use a shifted time tag acquisition word line of WL65 and WL 55, respectively. As shown, the failed bit count is significantly reduced.

Figure 20:
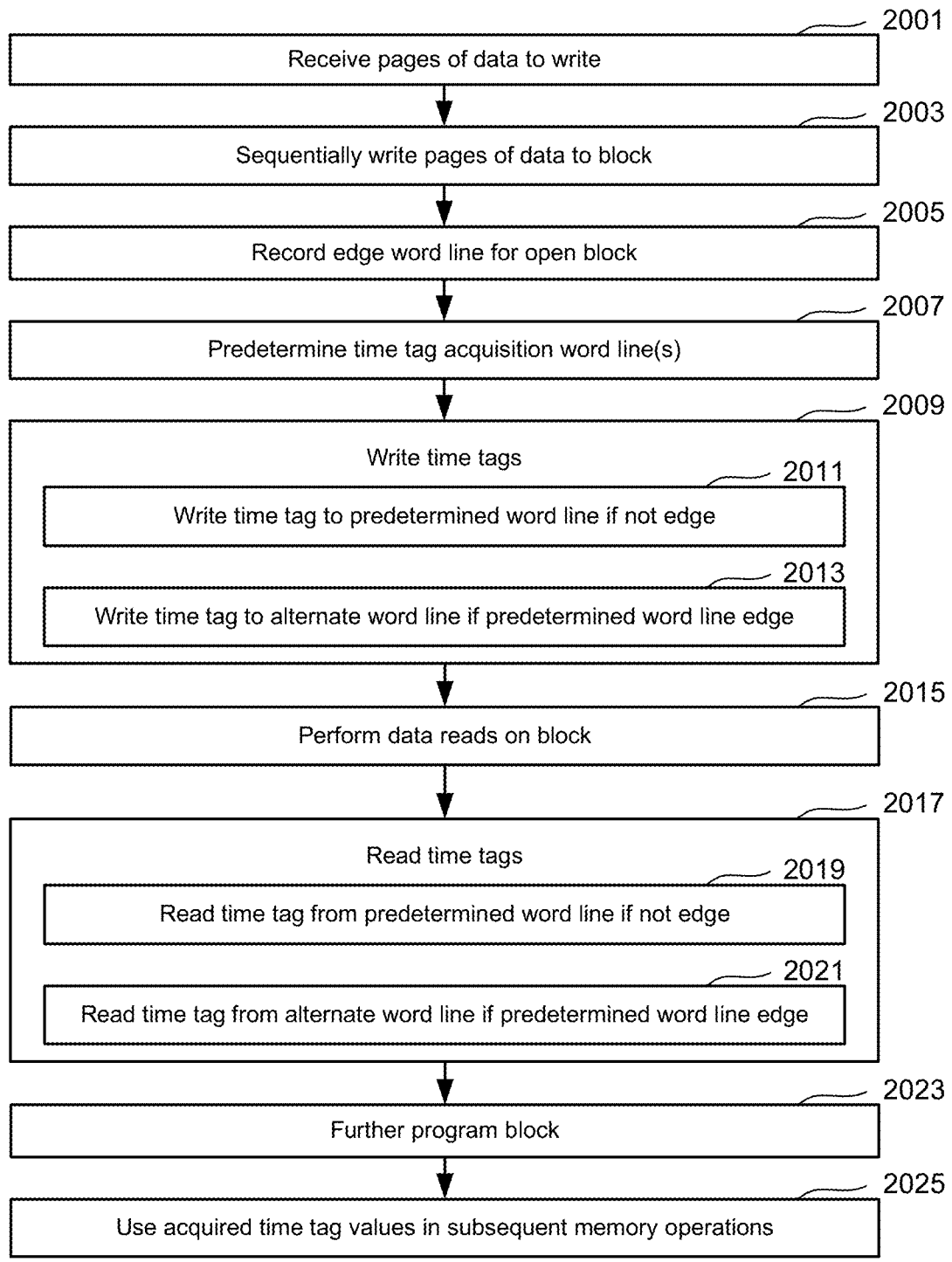
FIG. 20 is a flowchart for an embodiment of time tag word line shift to reduce failed bit count spikes when the time tag acquisition word line is an edge word line.

FIG. 20 is a flowchart for an embodiment of time tag word line shift to reduce failed bit count spikes that can occur when the time tag acquisition word line is an edge word line. FIG. 20 repeats some of the features of FIG. 18, but places these in the larger context. Beginning at step 2001, one or more pages of data are received at the control circuitry of the memory circuitry, typically from the memory controller 102, where this can be new data from the host 120 or data already present on the memory that is being refreshed or otherwise relocated. The pages of data are then sequentially written to a block of the memory array 302 at step 2003 using the row control circuitry 320 and column control circuitry 310 under the control of the system control logic 360. In the main examples here, the write is multi-level cell programming as described with respect to FIGS. 7B-12 and can use a foggy-fine algorithm, as described with respect to FIG. 13. Depending on the number of pages of data written, a number of blocks may be fully written and closed, but the focus here is when a block (e.g., the last block when multiple blocks are written) that is only partially written, so that there is an edge word line as described with respect to word line WL60 in FIG. 15A. Consequently, steps 2001 and 2003 can be as for a typical program operation that ends with a partially written, open block. At step 2005, fully written blocks can be marked as closed and for an open block the word line number of the last written (i.e., edge) word line of the block can be recorded by the control circuitry, where this value can be stored in storage 366 of system control logic 360, for example, and/or on controller 102 is SRAM memory, where this value will, under normal operation, be known as part of the logical to physical address conversion performed by the controller when it assigns physical pages on a block of memory.

In the example embodiments presented here, one or more word lines are predetermined, at step 2007, as time tag acquisition word lines. In a zone based embodiment, where zones are distinct, contiguous subsets of the block's word lines, one word line of each zone can be assigned to be the predetermined time tag acquisition word line. The zones and the time tag acquisition word line of each zone can be determined as part of the design and device characterization process, where the predetermined values can stored as parameter values in registers of storage 366 of system control logic 360, for example, and/or on controller 102 in parameter memory. Time tag values are then written in step 2009, where these can be written at the same as the other data for a word line programmed into the word line or in a separate write. Depending on the embodiment, one or multiple word lines can be written with a time tag value, such as a single time tag at a predetermined time tag acquisition word line for the block or, in a zone based embodiment, one predetermined time tag acquisition word line per zone. Additional word lines may also be written with time tag values. In one set of embodiment, similar to as described above with respect to FIG. 18, the system control logic 360 can decide whether the predetermined word line is an edge word line of the write operation and, if not, at step 2011 the time tag value is written to the predetermined word line that will then subsequently be used for time tag acquisition. If the system control logic 360 determines the predetermined word line is an edge word line of the write operation, at step 2013 the time tag value is written to a word line other than the predetermined word line to be subsequently used for time tag acquisition. As discussed above, in the case of zone based block operation with a predetermined time tag acquisition word line in each block, the word line selected to be the data acquisition word line instead of the zone's predetermined word line can be selected from the same zone. In some embodiments, time tags can be written to both the predetermined time tag acquisition word lines and also to one or more other word lines and the decision, based on which is an edge word line, can then be made as part of the read for time tag acquisition.

The memory block then undergoes some number of data reads at step 2015 while still open, leading to the sort of edge word line disturb described with respect to FIG. 15A. The time tag value is acquired at step 2017, as described in more detail above with respect to FIG. 18. If the predetermined time tag acquisition word line is not an edge word line, then it is used for time acquisition at step 2019; if the predetermined time acquisition word line is an edge word line, then an alternate word line is used for time tag acquisition at step 2021, such as another word line of the same zone. Sometime after the initial programming at step 2003, the block is further programmed at step 2023, either to fully program the block and close it out, or further program such that it is still open, in which case another word line is now the edge word line. (If the block is still open after step 2023, the time tag word line shift approach can then be applied to the new edge word line.)

Even after being further programmed at step 2023, time tag values can still acquired as in steps 2017, 2019, and 2021 due to possible disturbs on the edge word line at step 2015. In an alternate embodiment, the choice of using the predetermined data acquisition word line or the alternate word line can also be based on if the number of reads at step 2015 was small. For any of these embodiments, once a time tag value is acquired at step 2025, it can then be used by the control circuitry in memory operations, such as determining whether to perform a data refresh or other housekeeping operations, or as determining voltage shifts for optimal Vread or other voltage from a look up table with values determined as part of device characterization and stored in memory on one or both of the controller 102 or the system control logic 360.

One embodiment includes a non-volatile memory device comprising a control circuit configured to connect to a memory array comprising a plurality of blocks of non-volatile memory cells connected along word lines. The control circuit configured to: receive a first plurality of pages of data; write the first plurality of pages of data sequentially to a first set of one or more word lines of a first block of the memory array; in response to the first set of word lines being less than all of the word lines of the first block, save a word line number for the word line of the first set written last when writing of the first plurality of pages of data sequentially; assign one or more of the word lines of the first block for recording of time tag values during the writing of the first plurality of pages of data; determine whether the word line number for the word line of the first set written last is one of the word lines assigned for storage of time tag values. The control circuit is further configured to, during the writing of the first plurality of pages of data, record a time tag value, comprising: in response to the word line number for the word line of the first set written last not being one of the assigned word lines, record the time tag value in one of the assigned word lines; and in response to the word line number for the word line of the first set written last being one of the assigned word lines, record the time tag value in a word line other than one of the assigned word lines.

One embodiment includes a method comprising: sequentially programming a plurality of word lines of a block of NAND memory, the plurality of word lines being less than all of the word lines of the block; recording a word line number of last programmed of the sequentially programmed word lines; and concurrently with programing a plurality of word lines of the block, writing a time tag value to one of the plurality of word lines of the block. Writing the time tag value to one of the plurality of word lines of the block is performed by: determining whether the word line number of last programmed of the sequentially programmed word lines is one of one or more predetermined word lines; in response to the last programmed of the sequentially programmed word lines not being one of the one or more predetermined word lines, writing the time tag value to one of the predetermined word lines; and in response to the last programmed of the sequentially programmed word lines being one of the one or more predetermined word lines, writing the time tag value to a word line of the block of NAND memory other than one of the predetermined word lines.

One embodiment includes a non-volatile memory system, comprising: a memory array comprising a plurality of blocks of non-volatile memory cells connected along word lines and one or more control circuits connected to the one or more of memory arrays. The one or more control circuits are configured to: sequentially program a first plurality of word lines of a first block of the memory array memory, the first plurality of word lines being less than all of the word lines of the block and ending with a last written word line; write time tag values to a plurality of the first plurality of word lines, including a first predetermined word line; and read a first one of the time tag values. To read the first time tag value the one or more control circuits are configured to: determine whether the first predetermined word line is the last written word line; if the first predetermined word line is not the last written word line, read the first time tag value from the first predetermined word line; and if the first predetermined word line is the last written word line, read the first written time tag value from a word line other than the first predetermined word line.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory system, comprising:
   a control circuit configured to connect to a memory array comprising a plurality of blocks of non-volatile memory cells connected along word lines, the control circuit configured to:
   receive a first plurality of pages of data;
   write the first plurality of pages of data sequentially to a first set of one or more word lines of a first block of the memory array;
   in response to the first set of word lines being less than all of the word lines of the first block, save a word line number for the word line of the first set written last when writing of the first plurality of pages of data sequentially;
   assign one or more of the word lines of the first block for recording of time tag values during the writing of the first plurality of pages of data;
   determine whether the word line number for the word line of the first set written last is one of the word lines assigned for storage of time tag values; and
   during the writing of the first plurality of pages of data, record a time tag value, comprising:
   in response to the word line number for the word line of the first set written last not being one of the assigned word lines, record the time tag value in one of the assigned word lines; and
   in response to the word line number for the word line of the first set written last being one of the assigned word lines, record the time tag value in a word line other than one of the assigned word lines.

2. The non-volatile memory system of claim 1, further comprising:
   a memory die comprising the memory array, wherein the control circuit is on a control die, separate from and bonded to the memory die.

3. The non-volatile memory system of claim 1, wherein the first block comprises a plurality of zones, each zone comprising a distinct plurality of contiguous word lines, and wherein the control circuit is further configured to:
   assign a word line of each zone for recording of time tag values.

4. The non-volatile memory system of claim 3, wherein the control circuit is further configured to:
   in response to the word line number for the word line of the first set written last being the assigned word line of a first zone, record the time tag value in a word line of the first zone other than the assigned word line of the first zone.

5. The non-volatile memory system of claim 1, wherein the control circuit is further configured to write the first plurality of pages of data sequentially to the first set of one or more word lines in a multi-level cell format.

6. The non-volatile memory system of claim 5, wherein the control circuit is further configured to write the first plurality of pages of data sequentially to the first set of one or more word lines using a foggy-fine programming algorithm.

7. The non-volatile memory system of claim 1, wherein the control circuit is further configured to:

perform a read operation of one or more of the first plurality of pages of data written to the first set of one or more word lines, the read operation including reading the recorded time tag value.

8. The non-volatile memory system of claim 7, wherein the control circuit is further configured to:
subsequent to writing the first plurality of pages of data, receive a second plurality of pages; and
write one or more of the second plurality of pages of data such that all of the word lines of the first block are programmed.

9. The non-volatile memory system of claim 1, further comprising:
the memory array, wherein the memory has a three dimensional NAND architecture in which NAND string extend vertically from a substrate and the word lines run horizontally across the substrate.

10. A method, comprising:
sequentially programming a first plurality of word lines of a block of NAND memory, the first plurality of word lines being less than all of the word lines of the block;
recording a word line number of last programmed of the sequentially programmed word lines; and
concurrently with programing the first plurality of word lines of the block, writing a time tag value to one of the first plurality of word lines of the block by:
determining whether the word line number of last programmed of the sequentially programmed word lines is one of one or more predetermined word lines;
in response to the last programmed of the sequentially programmed word lines not being one of the one or more predetermined word lines, writing the time tag value to one of the predetermined word lines; and
in response to the last programmed of the sequentially programmed word lines being one of the one or more predetermined word lines, writing the time tag value to a word line of the block of NAND memory other than one of the predetermined word lines.

11. The method of claim 10, wherein the block comprises a plurality of zones each of a different plurality of contiguous word lines, and the one or more predetermined word lines are one predetermined word line for each of the zones.

12. The method of claim 11, further comprising:
in response to the last programmed of the sequentially programmed word lines being the predetermined word line of a first zone, writing the time tag value to a word line of the first zone other than the predetermined word line of the first zone.

13. The method of claim 10, wherein:
programming the first plurality of word lines of the block of NAND memory is a multi-level cell programming operation using a foggy-fine programming algorithm.

14. The method of claim 10, further comprising:
performing a read operation of one or more of the plurality of programmed word lines, the read operation including reading the time tag value.

15. The method of claim 14, further comprising:
subsequent to programming the first plurality of word lines of the block, programing the word lines of the block such that all of the word lines of the block are programmed.

16. A non-volatile memory system, comprising:
a memory array comprising a plurality of blocks of non-volatile memory cells connected along word lines; and
one or more control circuits connected to the one or more of memory arrays, the one or more control circuits configured to:
sequentially program a first plurality of word lines of a first block of the memory array, the first plurality of word lines being less than all of the word lines of the block and ending with a last written word line;
write time tag values to a plurality of the first plurality of word lines, including a first predetermined word line; and
read a first one of the time tag values, where to read the first time tag value the one or more control circuits are configured to:
determine whether the first predetermined word line is the last written word line;
if the first predetermined word line is not the last written word line, read the first time tag value from the first predetermined word line; and
if the first predetermined word line is the last written word line, read the first time tag value from a word line other than the first predetermined word line.

17. The non-volatile memory system of claim 16, wherein, to program the first plurality of word lines, the one or more control circuits are further configured to program the first plurality of word lines of the first block in a multi-level cell programming operation using a foggy-fine programming algorithm.

18. The non-volatile memory system of claim 16, wherein the first block comprises a plurality of zones each of a different plurality of contiguous word lines and each of the zones having a corresponding predetermined word line, the first predetermined word line belonging to a corresponding first zone of the first block.

19. The non-volatile memory system of claim 18, wherein the word line other than the first predetermined word line is a word line from the first zone.

20. The non-volatile memory system of claim 16, wherein the one or more control circuits are further configured to:
prior to reading the first one of the time tag values, further program the word lines of the first block such that all of the word lines of the first block are programmed.

* * * * *